United States Patent
Cheng et al.

(10) Patent No.: US 12,160,374 B2
(45) Date of Patent: Dec. 3, 2024

(54) METHODS TO TRANSMIT MULTIPLE TRANSPORT BLOCKS FOR UNLICENSED WIDEBAND RADIO SYSTEMS

(71) Applicant: Telefonaktiebolaget LM Ericsson (PUBL), Stockholm (SE)

(72) Inventors: Jung-Fu Cheng, Fremont, CA (US); Reem Karaki, Aachen (DE); Stephen Grant, Pleasanton, CA (US); Gen Li, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 694 days.

(21) Appl. No.: 17/270,552

(22) PCT Filed: Aug. 22, 2019

(86) PCT No.: PCT/IB2019/057086
§ 371 (c)(1),
(2) Date: Feb. 23, 2021

(87) PCT Pub. No.: WO2020/039388
PCT Pub. Date: Feb. 27, 2020

(65) Prior Publication Data
US 2021/0185721 A1   Jun. 17, 2021

Related U.S. Application Data

(60) Provisional application No. 62/722,099, filed on Aug. 23, 2018.

(51) Int. Cl.
*H04L 12/28* (2006.01)
*H04L 1/1607* (2023.01)
(Continued)

(52) U.S. Cl.
CPC ............ *H04L 5/001* (2013.01); *H04L 1/1671* (2013.01); *H04L 27/2602* (2013.01);
(Continued)

(58) Field of Classification Search
CPC ...... H04W 72/21; H04W 72/23; H04L 1/1671
(Continued)

(56) References Cited

U.S. PATENT DOCUMENTS

| 8,145,183 B2* | 3/2012 | Barbeau ................ H04M 3/487 |
| | | 455/414.3 |
| 2016/0157218 A1* | 6/2016 | Nam ..................... H04B 7/0632 |
| | | 370/329 |
| 2017/0367046 A1 | 12/2017 | Papasakellariou |
| 2019/0268883 A1* | 8/2019 | Zhang ................... H04L 5/0094 |

FOREIGN PATENT DOCUMENTS

| CO | 20190008014 | 7/2019 |
| EP | 3 131 225 A1 | 2/2017 |
| EP | 3 273 737 A1 | 1/2018 |
| WO | WO2018106043 A1 | 6/2018 |

OTHER PUBLICATIONS

PCT International Search Report issued for International application No. PCT/IB2019/057086—Nov. 26, 2019.
(Continued)

*Primary Examiner* — Dang T Ton
(74) *Attorney, Agent, or Firm* — Baker Botts L.L.P.

(57) ABSTRACT

A method by a wireless (110) device includes receiving, from a network node (160), one or more bandwidth pieces. The data scheduled in one of the one or more bandwidth pieces includes at least one complete transport block and control information corresponding to the at least one complete transport block. The method further includes transmitting the data based on the scheduling or control information.

26 Claims, 20 Drawing Sheets

(51) Int. Cl.
  *H04L 5/00*      (2006.01)
  *H04L 27/26*     (2006.01)
  *H04W 72/1268*   (2023.01)
  *H04W 72/21*     (2023.01)
  *H04W 72/23*     (2023.01)
  *H04W 74/02*     (2009.01)

(52) U.S. Cl.
  CPC ....... *H04W 72/1268* (2013.01); *H04W 72/21* (2023.01); *H04W 72/23* (2023.01); *H04W 74/02* (2013.01); *H04L 5/0048* (2013.01)

(58) Field of Classification Search
  USPC ........................................ 370/329, 395, 403
  See application file for complete search history.

(56) References Cited

OTHER PUBLICATIONS

PCT Written Opinion of the International Searching Authority issued for International application No. PCT/IB2019/057086—Nov. 26, 2019.
3GPP TSG-RAN WG1 Meeting #94; Gothenburg, Sweden; Source: Ericsson; Title: Frame structure for NR-U (R1-1809201)—Aug. 20-24, 2018.
Official Communication from Republic of Columbia, Superintendency of Industry and Commerce issued for No. NC2021/0003066—Nov. 22, 2023.

* cited by examiner

METHODS TO TRANSMIT MULTIPLE TRANSPORT BLOCKS FOR UNLICENSED WIDEBAND RADIO SYSTEMS

PRIORITY

This nonprovisional application is a U.S. National Stage Filing under 35 U.S.C. § 371 of International Patent Application Serial No. PCT/IB2019/057086 filed Aug. 22, 2019 and entitled "METHODS TO TRANSMIT MULTIPLE TRANSPORT BLOCKS FOR UNLICENSED WIDEBAND RADIO SYSTEMS" which claims priority to U.S. Provisional Patent Application No. 62/722,099 filed Aug. 23, 2018 both of which are hereby incorporated by reference in their entirety.

BACKGROUND

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. We refer to such networks as NR systems in the following which is currently studied in 3GPP now. Besides traditional licensed exclusive bands, NR systems are also expected to be operating on unlicensed bands especially for enterprise solutions. This topic will be discussed in 3GPP as a study item from middle 2017.

Multiple numerologies are supported in NR. A numerology is defined by sub-carrier spacing and CP overhead. Multiple subcarrier spacings can be derived by scaling a basic subcarrier spacing by an integer $2^n$. The numerology used can be selected independently of the frequency band although it is assumed not to use a very small subcarrier spacing at very high carrier frequencies. Flexible network and UE channel bandwidth is supported.

From RAN1 specification perspective, maximum channel bandwidth per NR carrier is 400 MHz in Rel-15. Note that all details for channel bandwidth at least up to 100 MHz per NR carrier are to be specified in Rel-15. At least for single numerology case, candidates of the maximum number of subcarriers per NR carrier is 3300 or 6600 in Rel-15 from RAN1 specification perspective. NR channel designs should consider potential future extension of these parameters in later releases, allowing Rel-15 UE to have access to NR network on the same frequency band in later release A subframe duration is fixed to 1 ms and frame length is 10 ms. Scalable numerology should allow at least from 15 kHz to 480 kHz subcarrier spacing. All numerologies with 15 kHz and larger subcarrier spacing, regardless of CP overhead, align on symbol boundaries every 1 ms in NR carrier. More specifically, for the normal CP family, the following is adopted:

For subcarrier spacing of 15 kHz*$2^n$ (n is non-negative integer),

Each symbol length (including CP) of 15 kHz subcarrier spacing equals the sum of the corresponding $2^n$ symbols of the scaled subcarrier spacing.

Other than the first OFDM symbol in every 0.5 ms, all OFDM symbols within 0.5 ms have the same size The first OFDM symbol in 0.5 ms is longer by $16T_s$ (assuming 15 kHz and FFT size of 2048) compared to other OFDM symbols.

$16 T_s$ is used for CP for the first symbol.

For subcarrier spacing of 15 kHz*$2^n$ (n is a negative integer)

Each symbol length (including CP) of the subcarrier spacing equals the sum of the corresponding $2^{-n}$ symbols of 15 kHz.

Multi-channel UL transmission is provided for eLAA. The baseline for LAA UL multicarrier operation is the extension of the single carrier operation when the eNB schedules PUSCH transmissions on multiple carriers. The LBT type on each carrier is signaled to the UE via corresponding UL grant.

Moreover, a UE that has received UL grants on a set of carriers scheduled with Cat. 4 LBT with the same starting point in the subframe on all carriers can switch to a 25 us LBT immediately before transmission on a carrier in the set if Cat. 4 LBT has successfully completed on a designated carrier in the set. The UE must select one carrier uniformly randomly among the carriers which were scheduled with Cat. 4 LBT as the designated carrier prior to starting the Cat. 4 LBT procedure on any of the carriers in the set.

FIG. 1 illustrates examples for multi-channel UL transmission in eLAA. Note that different transportation blocks (TB) are generated for each carrier and subframe, as shown in FIG. 1, when LBT is successful in multiple channels according to the abovementioned rules. It is clear that guard band is available for each carrier. This is because of LTE limitation, i.e. the maximum bandwidth LTE could support is 20 MHz.

With regard to Multi-channel UL transmission for Wi-Fi, unlike eLAA, Wi-Fi (i.e. 802.11n, 802.11ac, etc.) defines new wider channel other than 20 MHz. FIG. 2 illustrates 20 MHz and 40 MHz channels for 802.11a. As shown in FIG. 2, 40 MHz could bring more usable subcarriers than simple aggregation of two 20 MHz. The benefit comes from two aspects: one is guard band decrease and the other is pilot subcarrier overhead savings. So wider channel could bring higher spectrum efficiency.

Before transmitting a 40 MHz frame, a station is responsible for ensuring that the entire 40 MHz channel is clear. Clear-channel assessment is performed on the primary channel according to the well-understood rules for transmission on an 802.11 channel. Even if a device intends to transmit a 40 MHz frame, the slot boundaries and timing are based on access to the primary channel only. The secondary channel must be idle during the priority interframe space before it may be used as part of a 40 MHz transmission. In Wi-Fi, UE decide when and how to transmit UL data itself based on LBT results, i.e. 20 MHz and 40 MHz transmission.

Similar to NR, it is expected that NR-U will support transmissions with wide bandwidth, e.g., up to several hundreds of MHz bandwidth. However, there could be different radio technologies with different device's capabilities that simultaneously share the same spectrum. It will be unlikely that a device will sense the channel free over the whole wide bandwidth, especially at high load. Thus, it is beneficial for NR-U to support transmissions with dynamic bandwidth, in which the device can decide which part(s) of the supported bandwidth to use based on its LBT outcome.

There are two common approaches for the device to use in wideband transmissions: carrier aggregation (CA) and single carrier wideband transmissions. In CA transmissions (similar to LTE-based LAA), the device performs LBT per component carrier (of, e.g., 20 MHz), then transmit on each free component carrier (CC). In single carrier wideband transmissions, the device performs LBT per LBT bandwidth piece (of 20 MHz) and aggregates resources from each free LBT bandwidth piece in a single physical SCH. FIG. 3 illustrates an example for the wideband operations using CA and single system carrier wideband of 80 MHz. Different UEs may operate on different maximum bandwidth sizes and transmit with different number of RBs depending on their LBT's outcomes.

Note that separate CORESETs and search spaces need to be configured for different LBT bandwidth pieces to ensure the availability of control signalling when at least one LBT bandwidth piece is available. In the example shown in the right hand side of FIG. 3. UE2 needs to monitor both CORESET2 and CORESET3 since the channel may be available only in LBT bandwidth piece 2 or only in LBT bandwidth piece 3. Similarly, UE3 shall monitor all four CORESETs to get its PDCCH. Furthermore, it is undesirable to configure a wide CORESET across LBT bandwidth pieces. Either the PDCCH is interleaved across the LBT bandwidth pieces or all PDCCH candidates locate in the unavailable LBT bandwidth pieces when part of the channel is busy. Both results in loss of scheduling opportunities. There is hence no difference between the CA and wide BWP approaches in terms of number of CORESETs and search spaces to monitor by the UE.

With regard to NR PDCCH SearchSpace Configuration, PDCCHs are organized as SearchSpaces using the CORESET. The current RRC configuration includes the following:
controlResourceSetId: reference to the CORESET for the SearchSpace
monitoringSlotPeriodicityAndOffset: Slots for PDCCH Monitoring configured as periodicity and offset.
duration: Number of consecutive slots that a SearchSpace lasts in every occasion, i.e., upon every period as given in the periodicityAndOff set.
monitoringSymbolsWithinSlot: Symbols for PDCCH monitoring in the slots configured for PDCCH monitoring (see monitoringSlotPeriodicityAndOffset). The most significant (left) bit represents the first OFDM in a slot.
nrofCandidates: Number of PDCCH candidates per aggregation level.
searchSpaceType: Indicates whether this is a common search space (present) or a UE specific search space as well as DCI formats to monitor for.

In LTE and NR a transport block is segmented into multiple code blocks if the transport block exceeds a certain size. For error detection each code block as well as the transport block have its own CRC. In LTE the HARQ feedback is based on the decoding status of the transport block, i.e. a single HARQ feedback bit is generated per transport block.

NR supports this operation mode. In addition, NR also supports code block group (CBG) based HARQ feedback. Here one or multiple code blocks are grouped into a CBG and one HARQ feedback bit is generated for each CBG. This is useful since only a fraction of the transport blocks needs to be retransmitted if only one or few CBG are in error. FIG. 4 illustrates NR code block group operations.

CBG-based feedback can be particular useful for very large transport blocks where a re-transmission of the complete transport block would lead to large overhead if only one or few code blocks are in error. With CBG-based feedback only the code block groups in error can be retransmitted. Another application of CBG-based feedback is preemption where an ongoing transmission is interrupted in favor of a low latency transmission. If the preempting transmission is only of short duration just a few code blocks might be destroyed, favoring again a selective transmission of individual code blocks.

After the data is encoded for MIMO transmission, modulation symbols are generated from the encoded data and the modulation symbols are further mapped to the allocated radio resources to form a transmission block (TB). In NR, the modulation symbols to radio resource mapping follows the layer->frequency->time order. According to data mapping rule in regular NR, the data mapping is illustrated in if one NR-U carrier spans multiple LBT bandwidth pieces. FIG. 5 illustrates data mapping following regular NR mapping rule for NR-U with multiple LBT bandwidth pieces.

Certain problems exist. For example, as mentioned above, NR will support at least 100 MHz carrier bandwidth according to current agreement. It will be naturally that NR-U will support new wide carrier larger than 20 MHz channel to increase the system capacity. However, Wi-Fi may have a sub-band transmission within a 20 MHz channel and to NR-U systems, one sub-band (20 MHz or more than that) are available from time or time or collision happens in specific channel instead of whole bandwidth of 100 MHz.

When one NR-U gNB operating with a whole bandwidth that spans multiple LBT bandwidth pieces (e.g. one LBT bandwidth piece is 20 MHz in 5 GHz band), the gNB shall perform LBT for the scheduled LBT bandwidth pieces. Based on the LBT results, partial of the scheduled bandwidth may be not available due to some other systems are using the unlicensed channels as well. Owing to the nature of un-licensed spectrum, if multiple of radio systems are active in transmissions, such case of partial availability of whole NR-U spectrum has a high likelihood. One straight forward way is to puncture the data in that LBT bandwidth piece where LBT fails. However, when the data in more than one LBT bandwidth pieces is punctured, the receiver will not decode almost any code block in this case so that the whole transmission block should be retransmitted. This is quite inefficient which needs to be solved.

SUMMARY

Certain aspects of the present disclosure and their embodiments may provide solutions to these or other challenges. For example, methods, systems and techniques for transmitting multiple transport blocks for unlicensed wideband radio systems are provided.

According to certain embodiments, a method by a wireless device includes receiving, from a network node, one or more bandwidth pieces. The data scheduled in one of the one or more bandwidth pieces includes at least one complete transport block and control information corresponding to the at least one complete transport block. The method further includes transmitting the data based on the scheduling or control information.

According to certain embodiments, a wireless device includes memory operable to store instructions and processing circuitry operable to execute the instructions to cause the wireless device to receive, from a network node, one or more bandwidth pieces. The data scheduled in one of the one or more bandwidth pieces includes at least one complete transport block and control information corresponding to the at least one complete transport block. The processing circuitry is further operable to execute the instructions to cause the wireless device to transmit the data based on the scheduling or control information.

According to certain embodiments, a method by a network node includes transmitting, to a wireless device, one or more bandwidth pieces. The data scheduled in one of the one or more bandwidth pieces comprises at least one complete transport block and control information corresponding to the at least one complete transport block. The method further includes receiving, from the wireless device, the data transmitted based on the scheduling or control information.

According to certain embodiments, a network node includes memory operable to store instructions and processing circuitry operable to execute the instructions to cause the network node to transmit, to a wireless device, one or more bandwidth pieces. The data scheduled in one of the one or more bandwidth pieces comprises at least one complete transport block and control information corresponding to the at least one complete transport block. The processing circuitry is further operable to execute the instructions to cause the network node to receive, from the wireless device, the data transmitted based on the scheduling or control information.

Certain embodiments may provide one or more of the following technical advantages. For example, one technical advantage may be that certain embodiments enable more efficient data transmission/retransmission when one unlicensed carrier spans multiple LBT bandwidth pieces (20 MHz bandwidth) such as 80 MHz.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 illustrates 20 MHz and 40 MHz channels for 802.11a;

DETAILED DESCRIPTION

Figure 1:
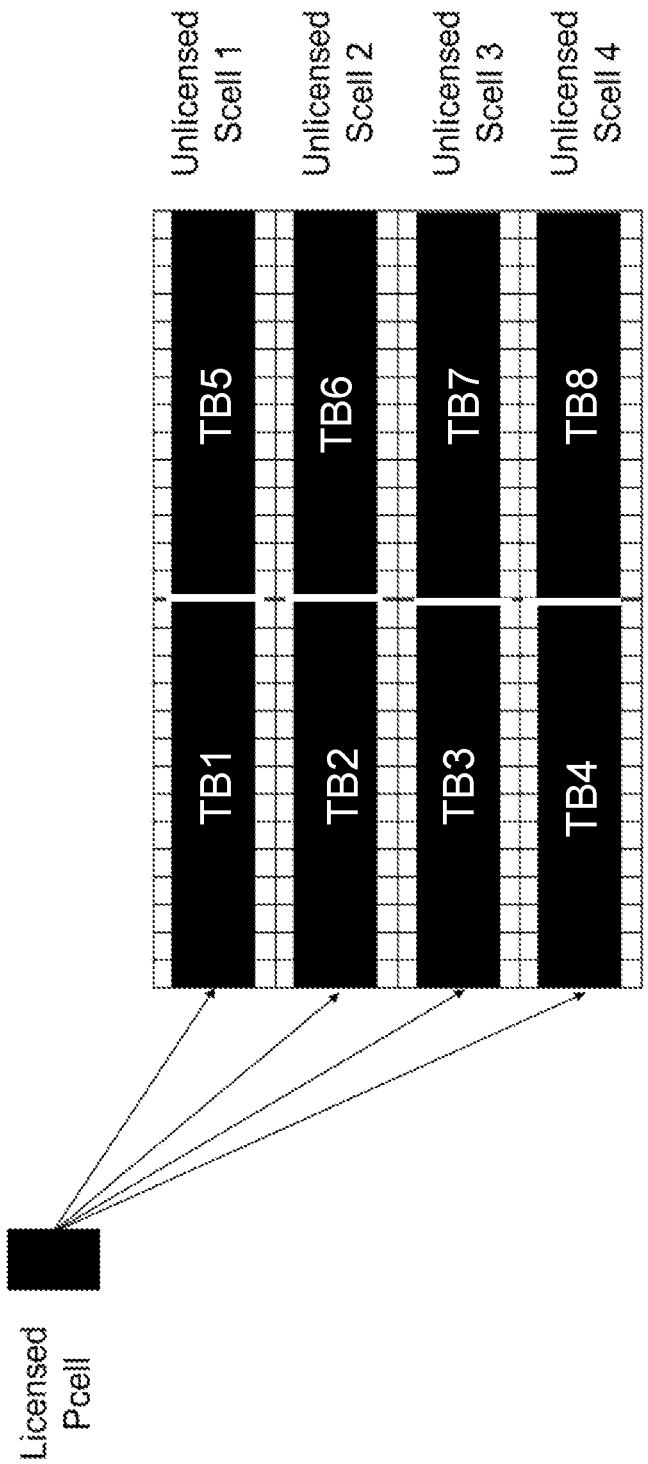
FIG. 1 illustrates examples for multi-channel UL transmission in eLAA.
Figure 2:
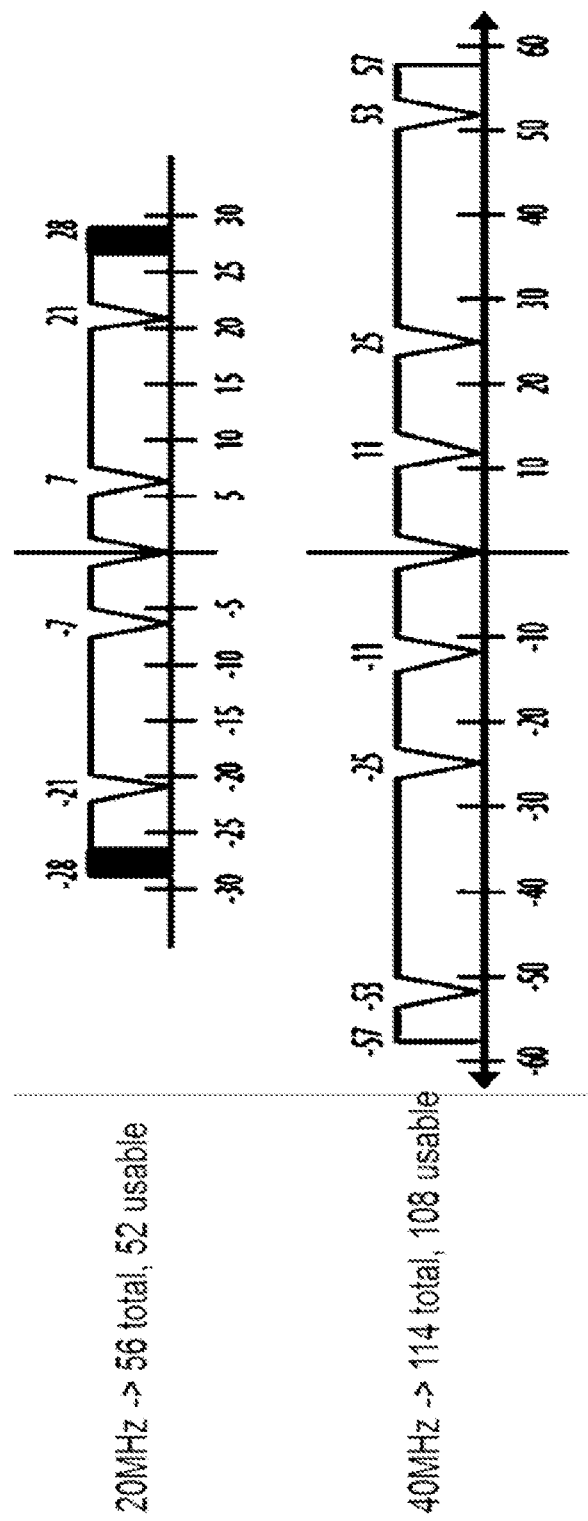
Figure 3:
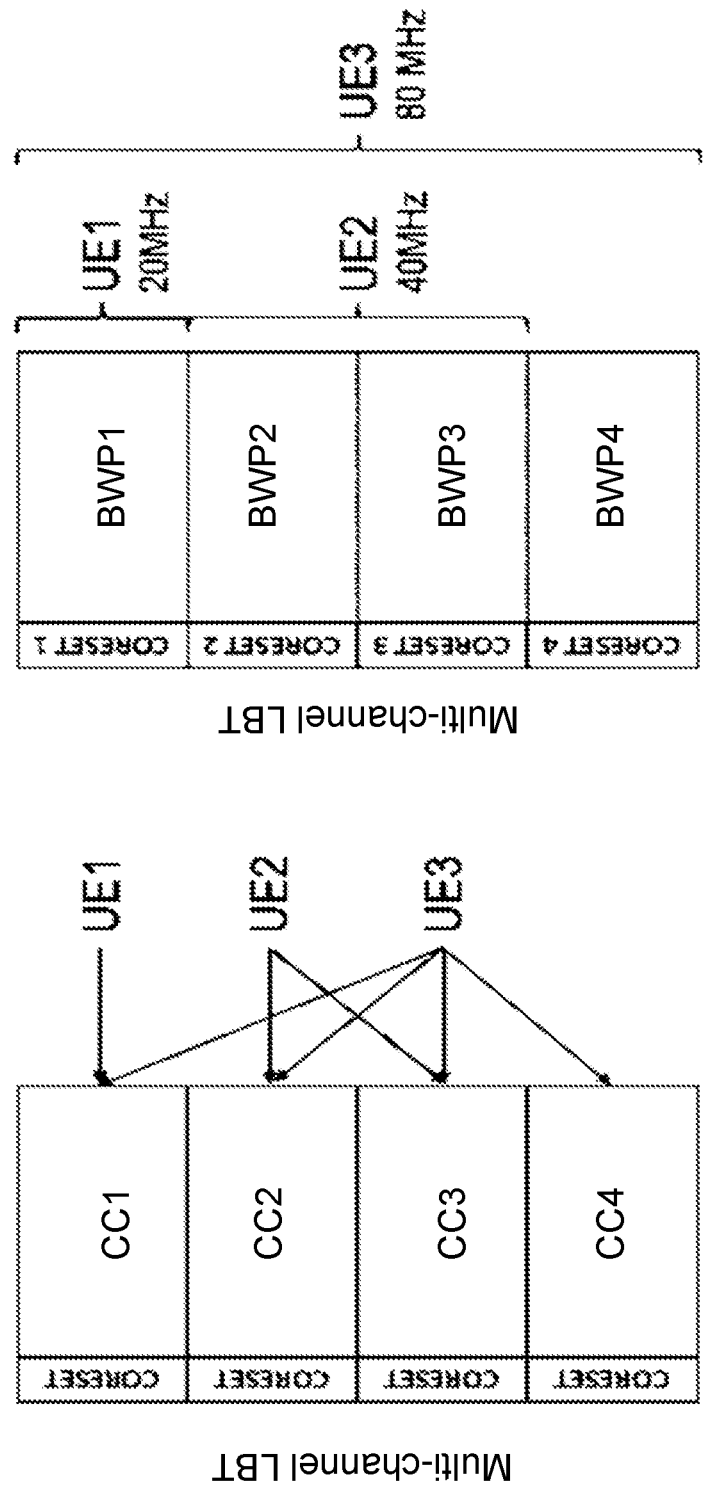
FIG. 3 illustrates an example for the wideband operations using CA and single system carrier wideband of 80 MH.
Figure 4:
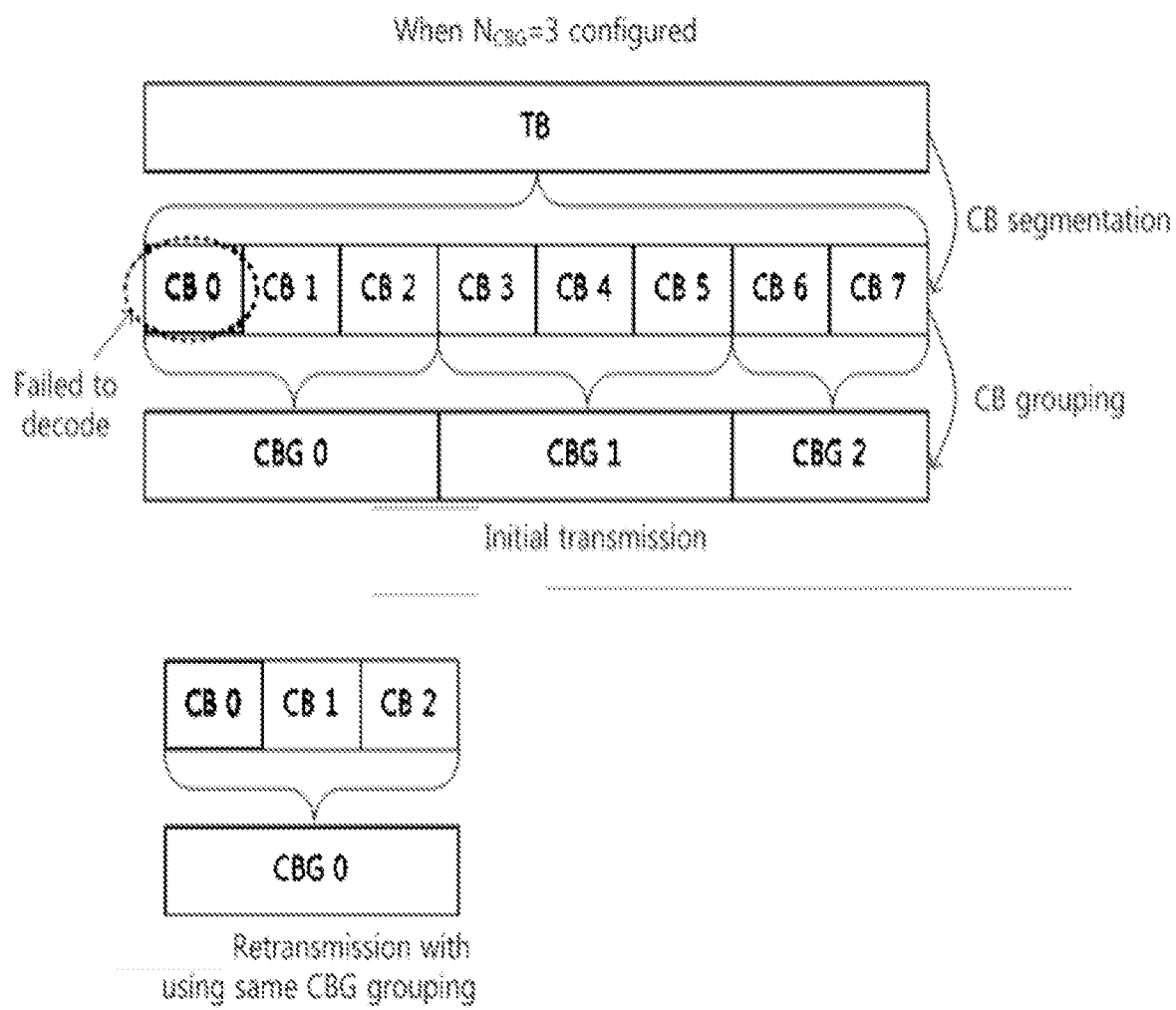
FIG. 4 illustrates NR code block group operations.
Figure 5:
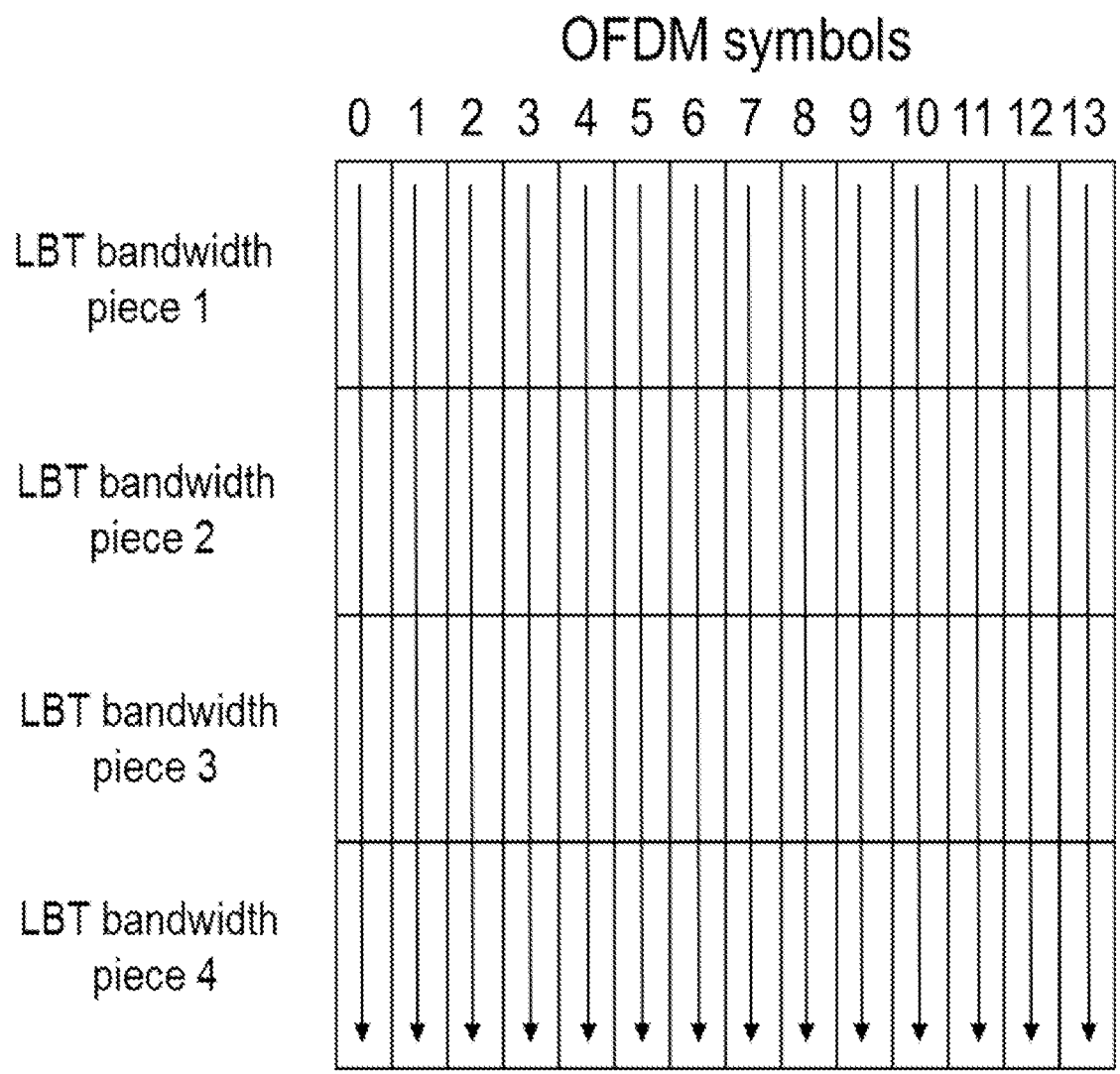
FIG. 5 illustrates data mapping following regular NR mapping rule for NR-U with multiple LBT bandwidth pieces.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

Although terminology from 3GPP NR has been used in this disclosure to describe certain embodiments, the scope of the invention is not limited to only the abovementioned systems. Other wireless systems may also benefit from exploiting the ideas covered within this disclosure.

According to certain embodiments, a method is provided for improving transmission efficiency for NR-U. A NR-U system spans multiple unlicensed channels (20 MHz bandwidth per channel) and part of scheduled channels may not be available or possible to be interfered by transmission collisions. According to a first embodiment, the data scheduled in one bandwidth piece will include complete transport block without TB splitting. According to a second embodiment, each bandwidth piece will include CORESET Without CORESET splitting.

In a particular embodiment, the data scheduled in one LBT bandwidth piece will include complete transport block without TB splitting.

Certain embodiments described herein may apply to multiple transport blocks in a wideband transmission. For example, according to certain embodiments, a bandwidth part may be composed of multiple bandwidth pieces, where the bandwidth piece corresponds to one or multiple LBT bandwidth unit(s), in a particular embodiment.

According to certain embodiments, the data scheduled in one bandwidth piece will include complete one or more transport block(s). This means that each bandwidth piece will include its own transport block(s). the scheduling/control information corresponding to these transport block(s) is also included in the same bandwidth piece. As a non-limiting example, a transport block is allocated per LBT bandwidth unit, in a particular embodiment. As such, as long as a receiver has received from a channel the corresponding TB and its information could be complete for an easy decoding of that TB.

According to a particular embodiment, the bandwidth part consists of plurality of transport blocks.

According to a particular embodiment, the location and the bandwidth of the bandwidth piece is higher layer configured or indicated in L1 signaling.

According to certain embodiments, an UL scheduling grant may include:
    a single grant multiple TBs: a single grant indicates
        Set of HARQ ids
        One base HARQ id, where the remaining HARQ ids are derived according a rule from the base HARQ Id. E.g. consecutive order.

The grant is sent once or repeated on multiple bandwidth pieces.
    a single grant scheduling one TB per bandwidth piece:
        UL Grant may indicate at least, HARQ Id and the bandwidth piece in which the corresponding TB should be sent in the UL.
        Alternatively, the bandwidth piece used for the transmission of the scheduled TB is assumed to be the same bandwidth piece in which the grant was received in the DL.

In current NR specs, UE supports up to 3 CORESETs per BWP. To support very wide BWP available in the unlicensed band (up to 160 MHz or 320 MHz), the current 3 CORESET limit present significant hurdle for NR-U to utilize wide spectrum efficiently.

Figure 6:
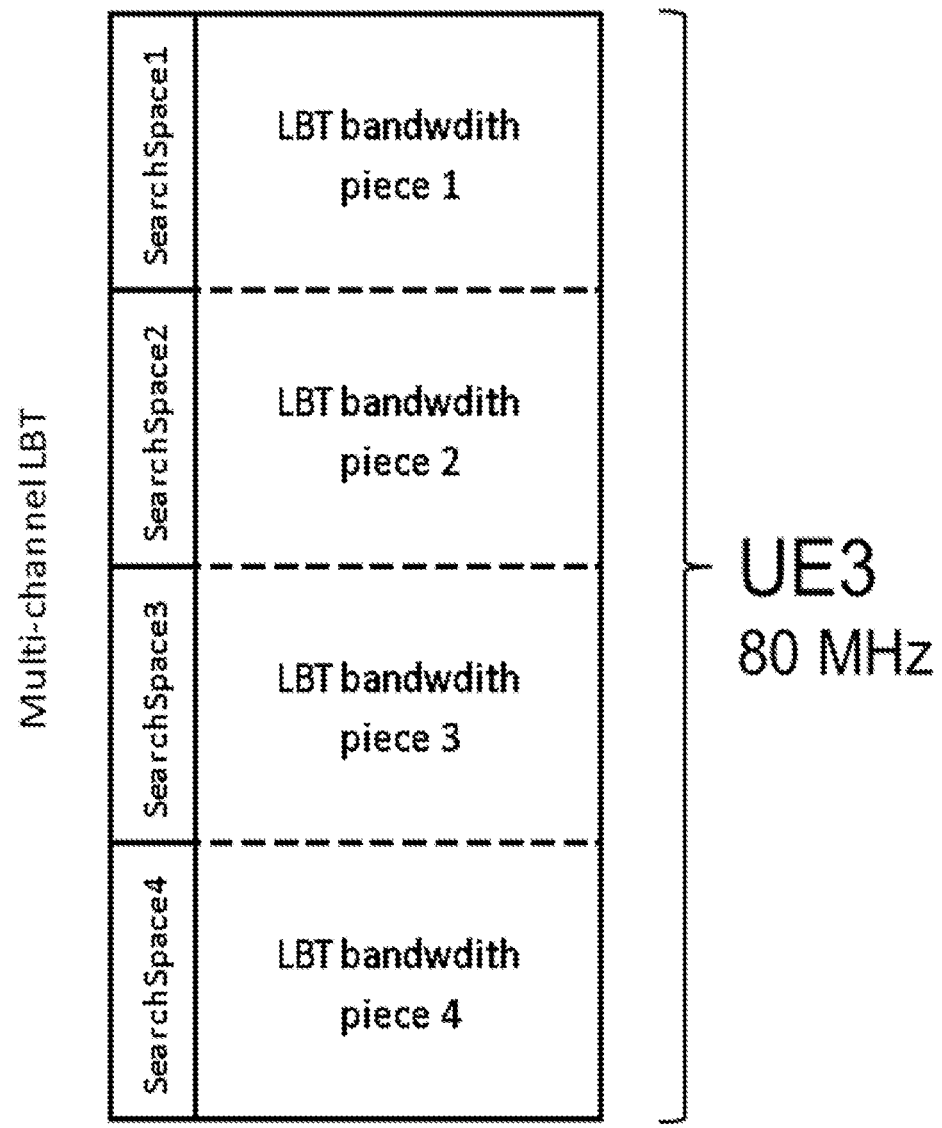
FIG. 6 illustrates a nonlimiting exemplary embodiment that includes multiple SearchSpaces configured from one CORESET, according to certain embodiments.

According to certain embodiments, PDCCH search spaces for different LBT bandwidth pieces can be configured by making a frequency domain translation of a CORESET defined for a LBT bandwidth piece. FIG. 6 illustrates a nonlimiting exemplary embodiment 50 that includes multiple SearchSpaces configured from one CORESET, according to certain embodiments.

With reference to FIG. 6, the example embodiment 50 may include:
    A CORESET with frequency resources located within LBT bandwidth piece 1.
    PDCCH SearchSpace1 for LBT bandwidth piece 1 can be configured based on existing NR specs. PDCCH SearchSpace2, SearchSpace3 and SearchSpace4 for LBT bandwidth pieces 2, 3 and 4 requires NR specs changes.
        According to a particular embodiment, PDCCH SearchSpace2 can be configured for LBT bandwidth piece 2 by adding a new frequency offset field for NR-U SearchSpace in the RRC configuration:
        monitoringFrequencyOffset: frequency offset to move the CORESET to a new frequency location
        Said frequency offset can be in unit of 6 RB (as is used in definition of CORESET). Said frequency offset can be in unit of RB or RBG size to allow fine tuning of SearchSpace locations.
    PDCCH SearchSpace3 and SearchSpace4 for LBT bandwidth pieces 3 and 4 can be configured similarly.
    According to another particular embodiment, PDCCH SearchSpace1, SearchSpace2, SearchSpace3 and SearchSpace4 for LBT bandwidth pieces 1, 2, 3 and 4 can be configured by a new monitoring LBT bandwidth piece bitmap in the RRC configuration:
        monitoringLBPsWithinBWP: LBT bandwidth pieces for PDCCH monitoring in the BWP configured for PDCCH monitoring. Each bit corresponding to monitoring PDCCH in the corresponding LBT bandwidth pieces According to a particular embodiment applicable to wideband transmission with PDCCH repetition, the data scheduled expand the whole bandwidth part as one transport block. However, the corresponding control information, i.e. PDCCH, is repeated in one or more bandwidth pieces.

According to a particular embodiment applicable to UL wideband transmission, the data scheduled expand the whole bandwidth part as one transport block, however, control information, i.e. UCI, is repeated in one or more bandwidth piece.

Figure 7:
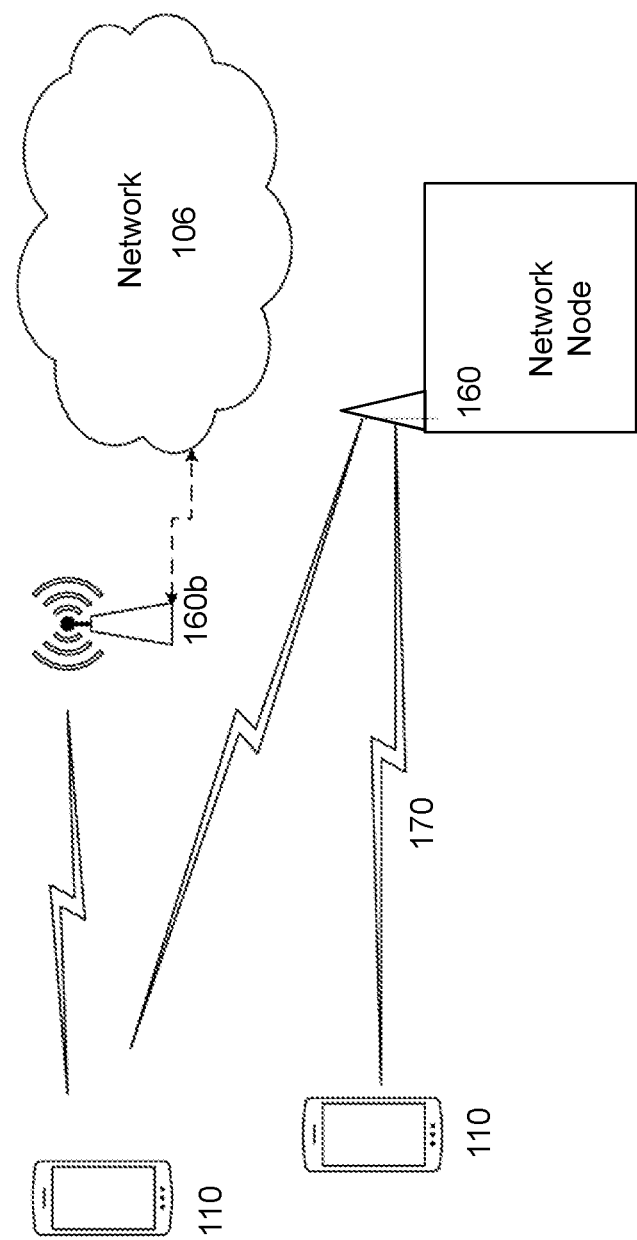
FIG. 7 illustrates an example wireless network, according to certain embodiments.

FIG. 7 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (wireless device) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
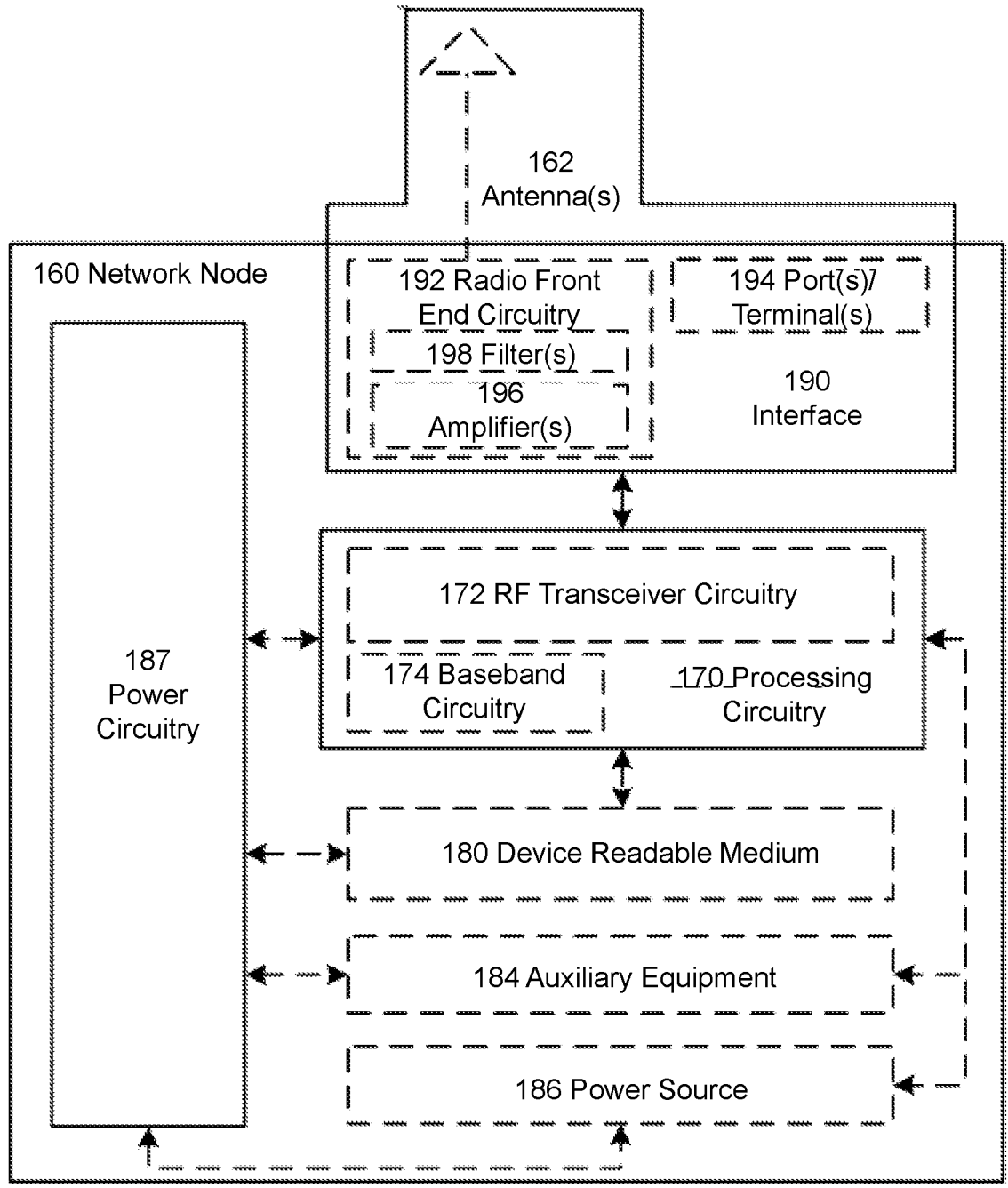
FIG. 8 illustrates an example network node, according to certain embodiments.

FIG. 8 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 9:
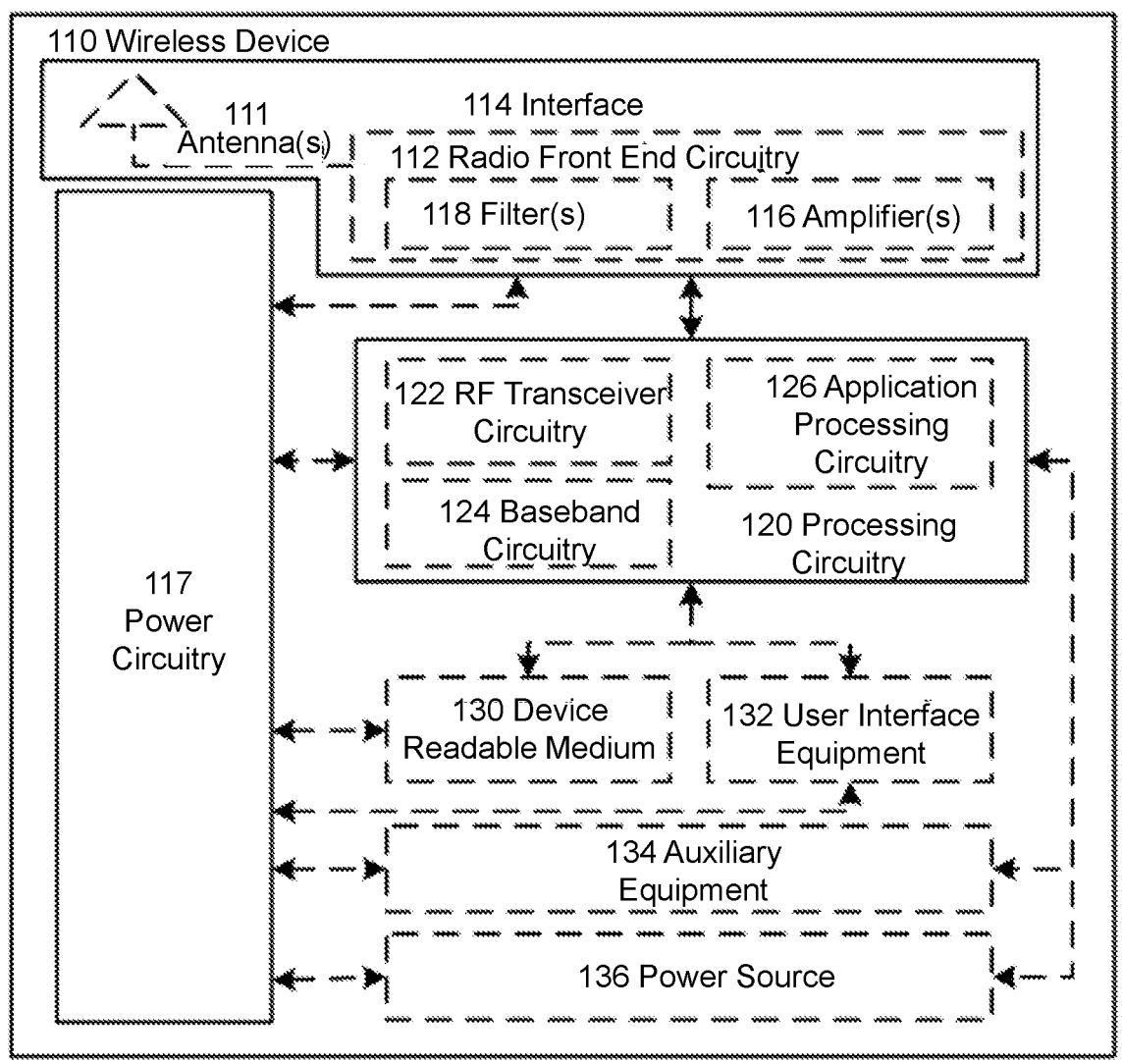
FIG. 9 illustrates an example wireless device, according to certain embodiments.

FIG. 9 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 10:
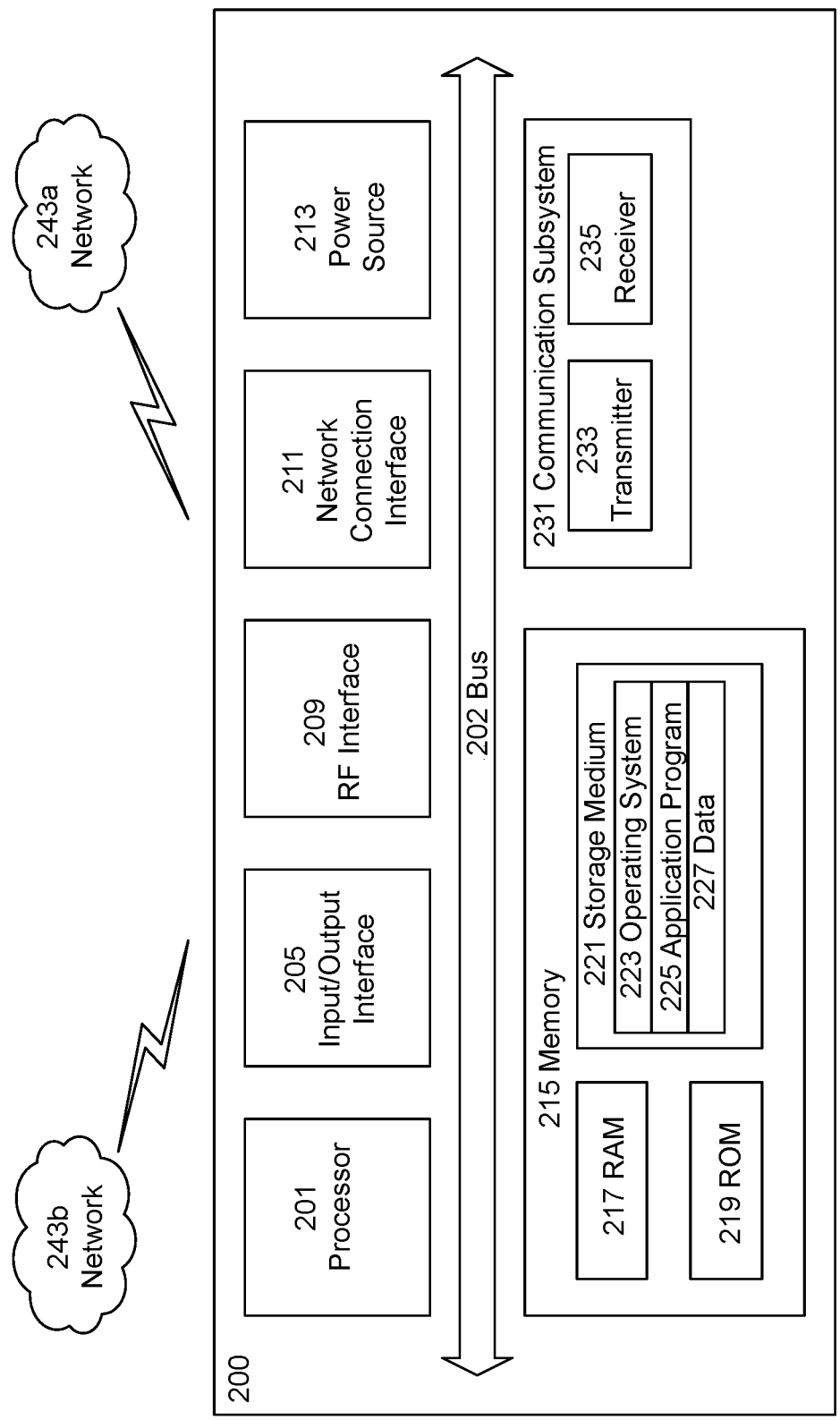
FIG. 10 illustrate an example user equipment, according to certain embodiments.

FIG. 10 illustrates one embodiment of a UE in accordance with various aspects described herein. As used herein, a user equipment or UE may not necessarily have a user in the sense of a human user who owns and/or operates the relevant device.

Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 10, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 11:
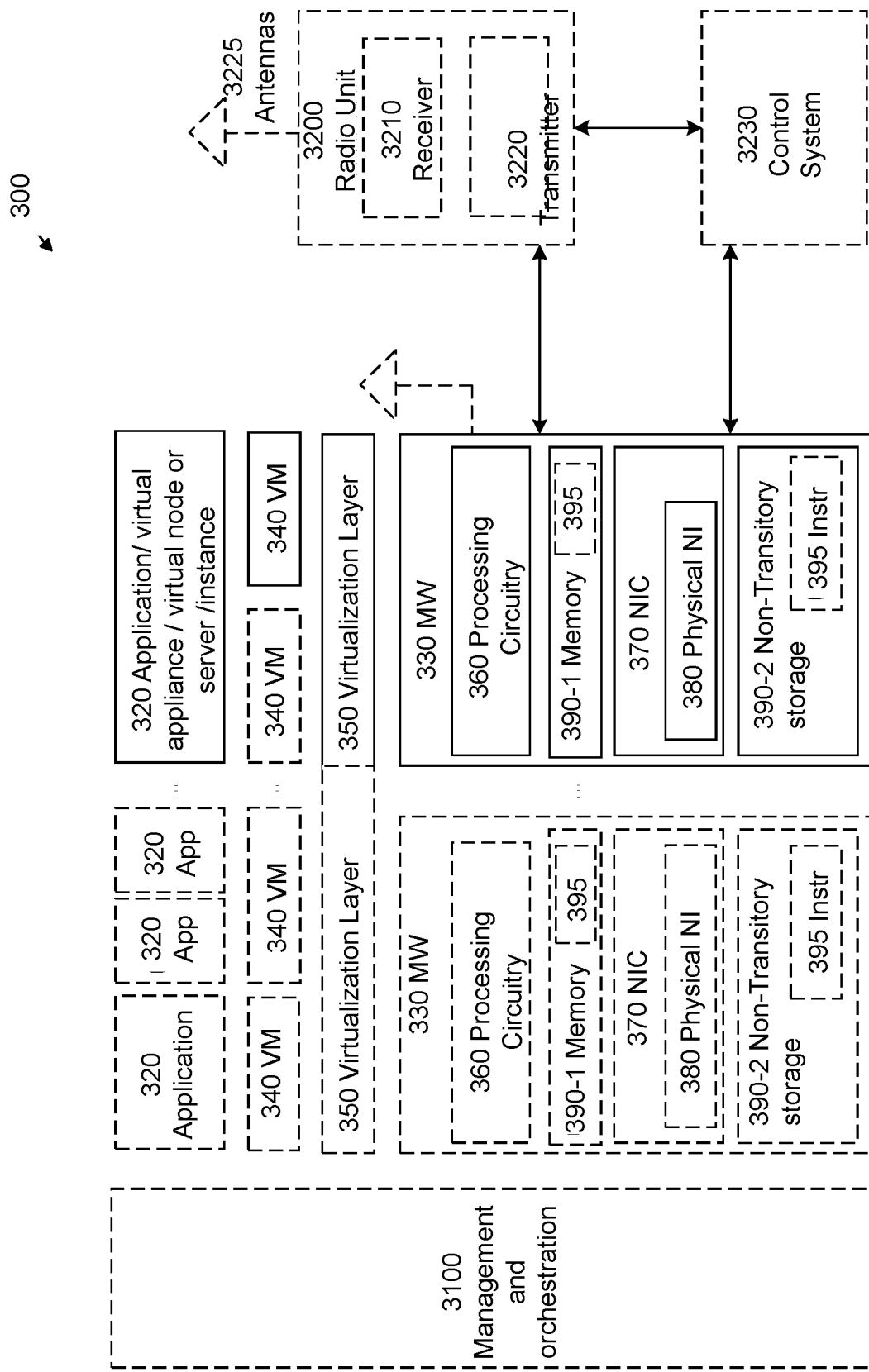
FIG. 11 illustrates a virtualization environment in which functions implemented by some embodiments may be virtualized, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 12:
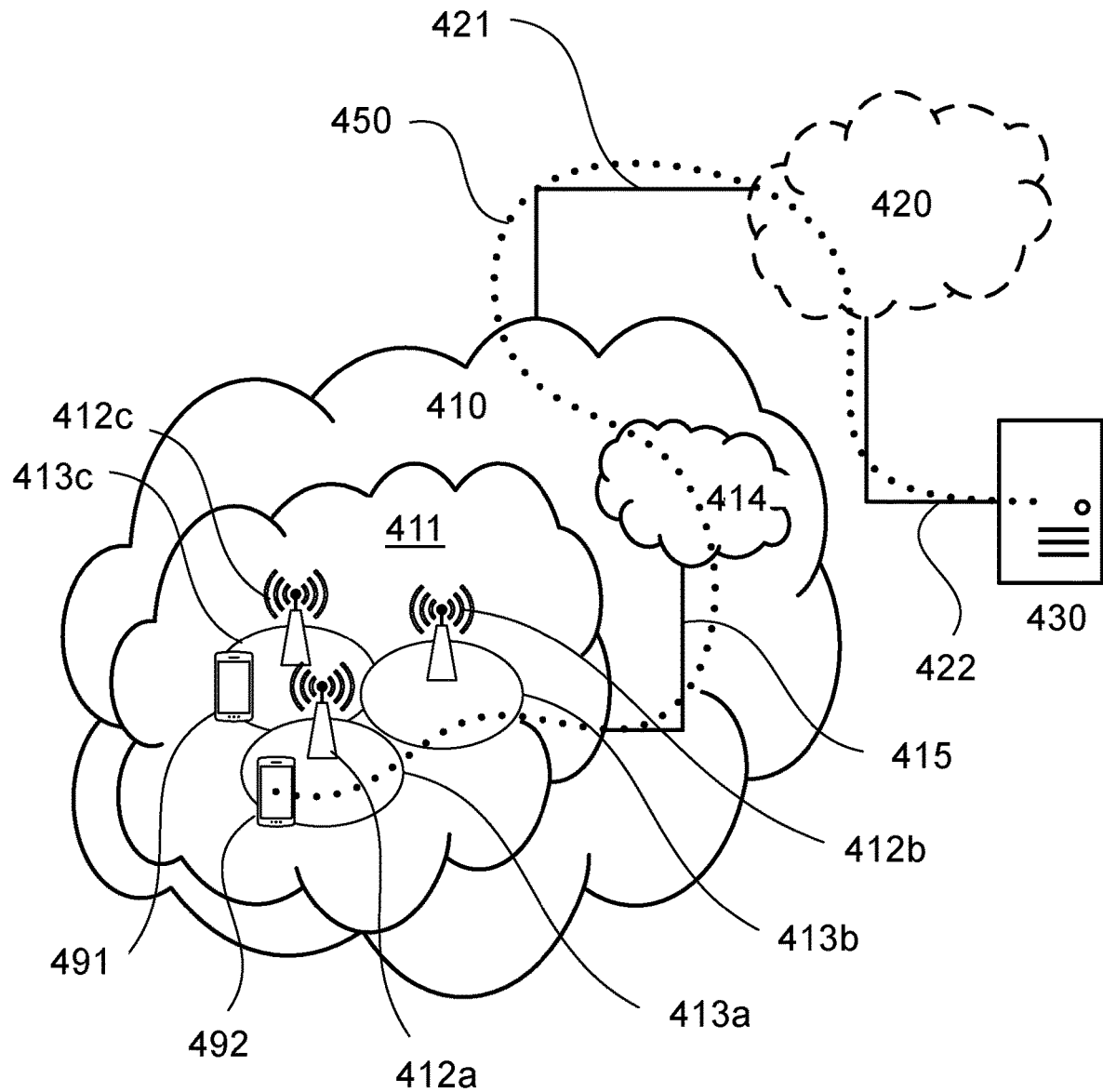
FIG. 12 illustrates a telecommunication network connected via an intermediate network to a host computer, according to certain embodiments.

FIG. 12 illustrates a telecommunication network connected via an intermediate network to a host computer in accordance with some embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
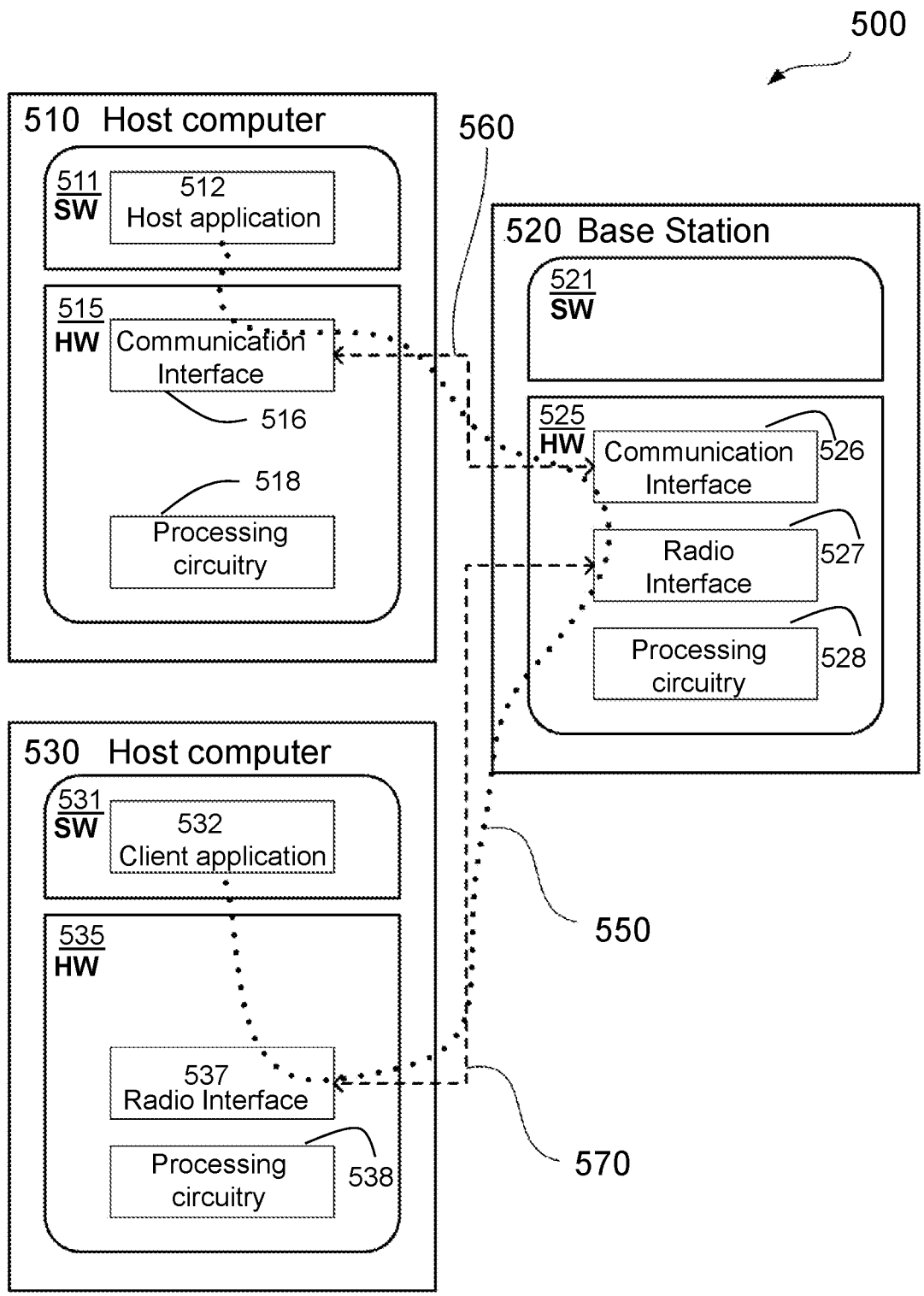
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 14, 15:
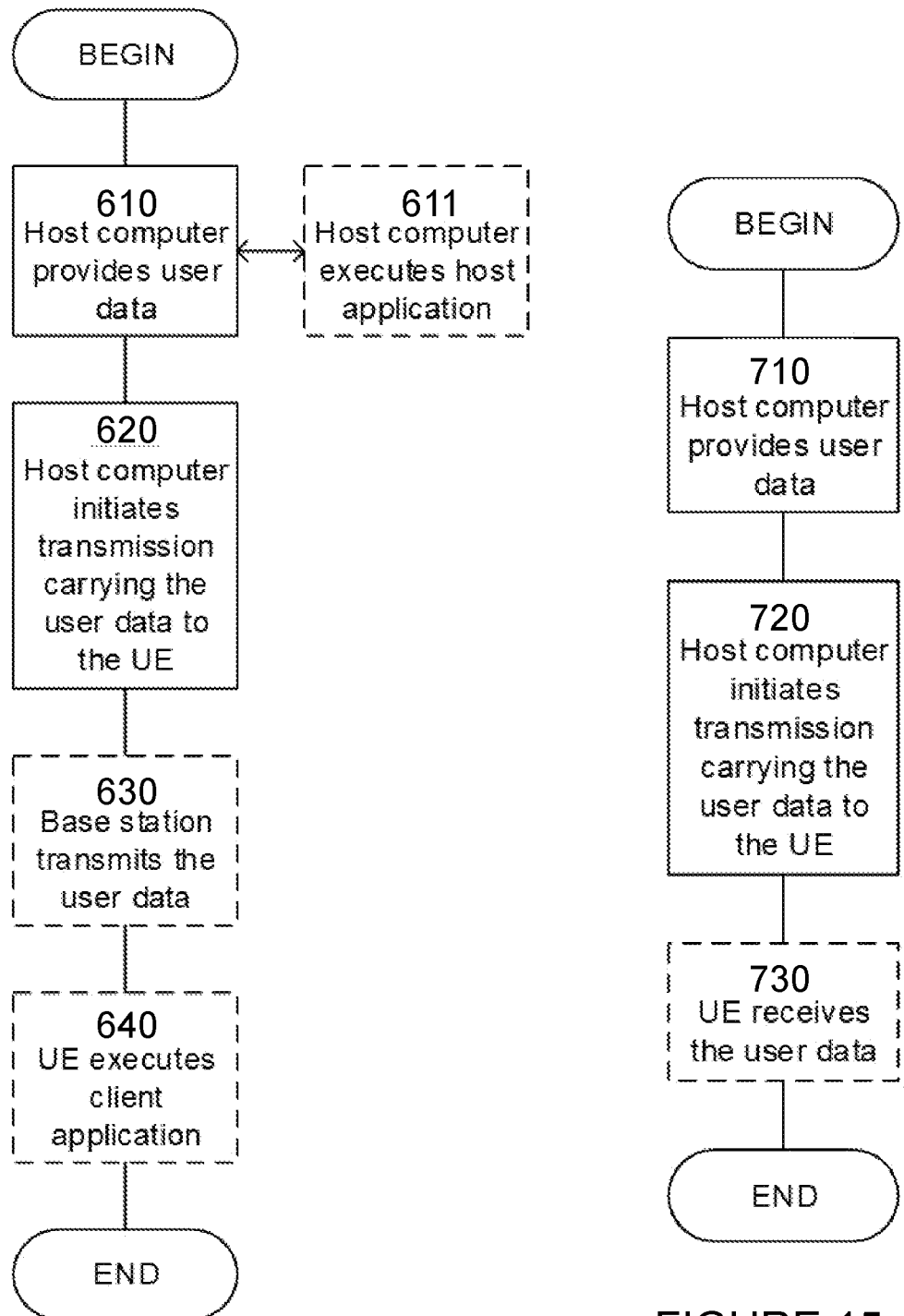
FIG. 14 illustrates a method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
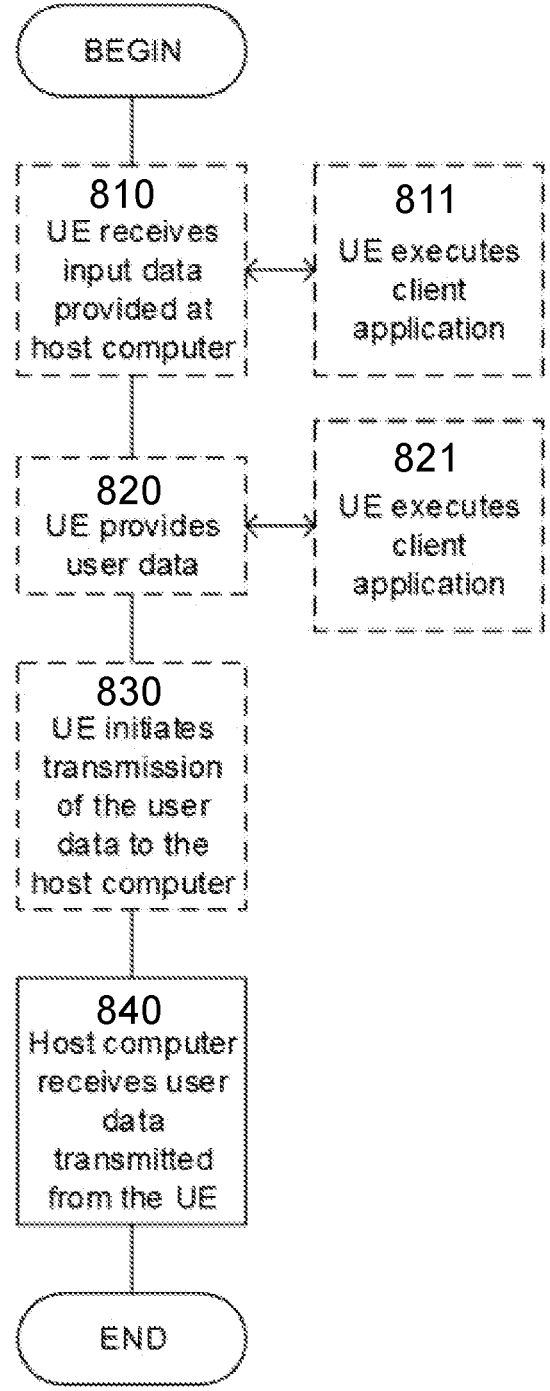
FIG. 16 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
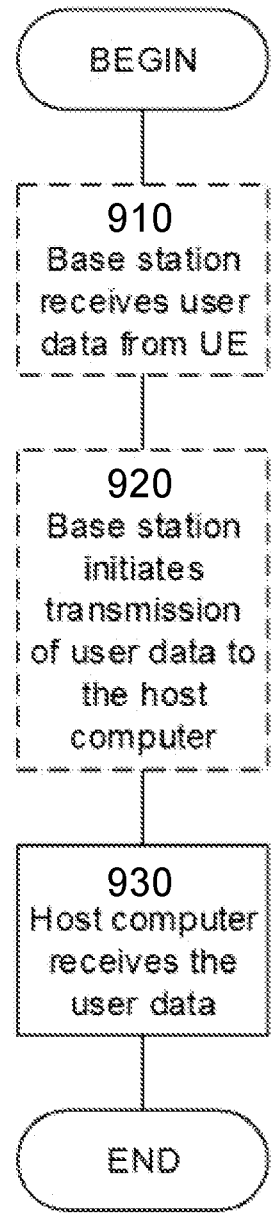
FIG. 17 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 18:
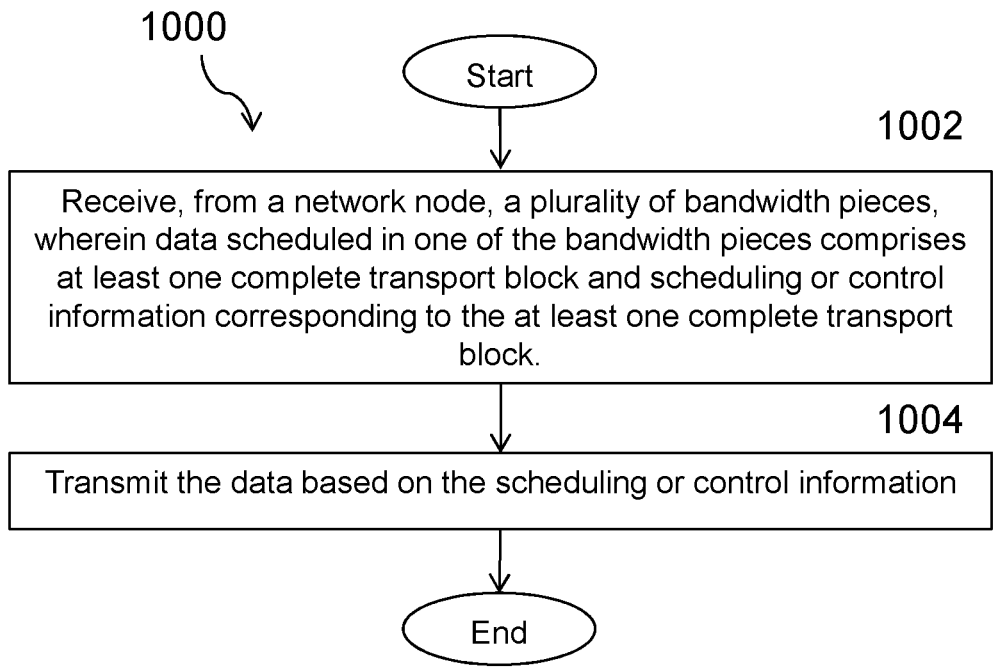
FIG. 18 illustrates an example method by a wireless device, according to certain embodiments.

FIG. 18 depicts a method by a wireless device, according to certain embodiments. At step 1002, the wireless device receives, from a network node, a plurality of bandwidth pieces, wherein data scheduled in one of the bandwidth pieces comprises at least one complete transport block and scheduling or control information corresponding to the at least one complete transport block. At step 1004, the wireless device transmits the data based on the scheduling or control information.

Figure 19:
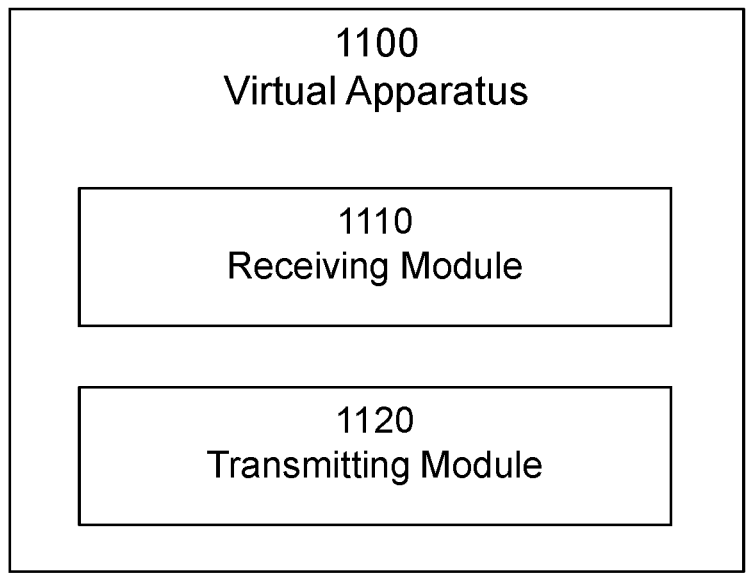
FIG. 19 illustrates an exemplary virtual computing device, according to certain embodiments.

FIG. 19 illustrates a schematic block diagram of a virtual apparatus 1100 in a wireless network (for example, the wireless network shown in FIG. 7). The apparatus may be implemented in a wireless device or network node (e.g., wireless device 110 or network node 160 shown in FIG. 7). Apparatus 1100 is operable to carry out the example method described with reference to FIG. 18 and possibly any other processes or methods disclosed herein. It is also to be understood that the method of FIG. 18 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, transmitting module 1120, and any other suitable units of apparatus 1100 to perform corresponding functions according one or more embodiments of the present disclosure.

According to certain embodiments, receiving module 1110 may perform certain of the receiving functions of the apparatus 1100. For example, receiving module 1110 may receive, from a network node, a plurality of bandwidth pieces, wherein data scheduled in one of the bandwidth pieces comprises at least one complete transport block and scheduling or control information corresponding to the at least one complete transport block.

According to certain embodiments, transmitting module 1120 may perform certain of the transmitting functions of the apparatus 1100. For example, transmitting module 1120 may transmit the data based on the scheduling or control information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
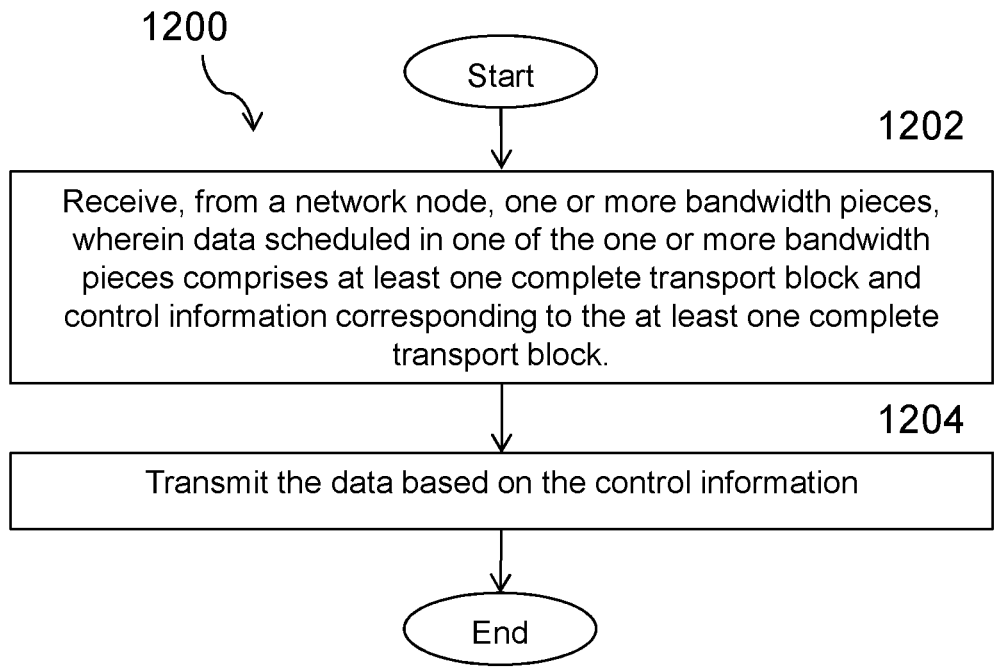
FIG. 20 illustrates another example method by a wireless device, according to certain embodiments.

FIG. 20 depicts a method by a wireless device 110, according to certain embodiments. At step 1202, the wireless device 110 receives, from a network node 160, one or more bandwidth pieces. The data scheduled in one of the one or more bandwidth pieces includes at least one complete transport block and control information corresponding to the at least one complete transport block. At step 1204, the wireless device 110 transmits the data based on the scheduling or control information.

In a particular embodiment, the at least one complete transport block is allocated per LBT bandwidth unit.

In a particular embodiment, each of the one or more bandwidth pieces corresponds to one or multiple bandwidth units.

In a particular embodiment, wireless device 110 decodes the data scheduled in the one of the one or more bandwidth pieces based on the control information in the at least one complete transport block.

In a particular embodiment, wireless device 110 receives an uplink grant scheduling a plurality of transport blocks. In a further particular embodiment, the plurality of transport blocks comprises the at least one complete transport block. In a further particular embodiment, the uplink grant comprises a set of HARQ identifiers. In a further particular embodiment, the uplink grant comprises a first HARQ identifier and the method further includes deriving at least one additional HARQ identifier based on the first HARQ identifier.

In a particular embodiment, wireless device 110 receives an uplink grant scheduling one transport block per bandwidth piece. In a further particular embodiment, the uplink grant comprises a HARQ identifier and a bandwidth piece in which a particular transport block should be transmitted on an uplink. In a further particular embodiment, the wireless device 110 transmits the particular transport block on the uplink. In a further particular embodiment, the wireless device determines that the bandwidth piece in which the uplink grant was received corresponds to the bandwidth piece used for the transmission of the scheduled transmission block.

In a particular embodiment, the wireless device 110 monitors at least one search space for each of the one or more bandwidth pieces.

In a particular embodiment, the wireless device 110 determines the at least one search space based on a frequency offset for moving a CORESET associated with the one or more bandwidth pieces to a new location. In a further particular embodiment, the wireless device 110 receives a LBT bandwidth piece bitmap from the network node. Each bit in the LBT bandwidth piece bitmap corresponds to one of the one or more bandwidth pieces, and when monitoring the at least one search space for each of the one or more bandwidth pieces, wireless device 110 performs physical downlink control channel monitoring in the one of more bandwidth pieces based on the LBT bandwidth piece bitmap.

In a particular embodiment, wireless device 110 applies the control information for the one or more bandwidth pieces. In a further particular embodiment, when applying the control information, wireless device 110 repeatedly applies the control information for each of the one or more bandwidth pieces.

In a particular embodiment, wireless device 110 transmits, by the wireless device 110, control information on the one or more bandwidth pieces.

Figure 21:
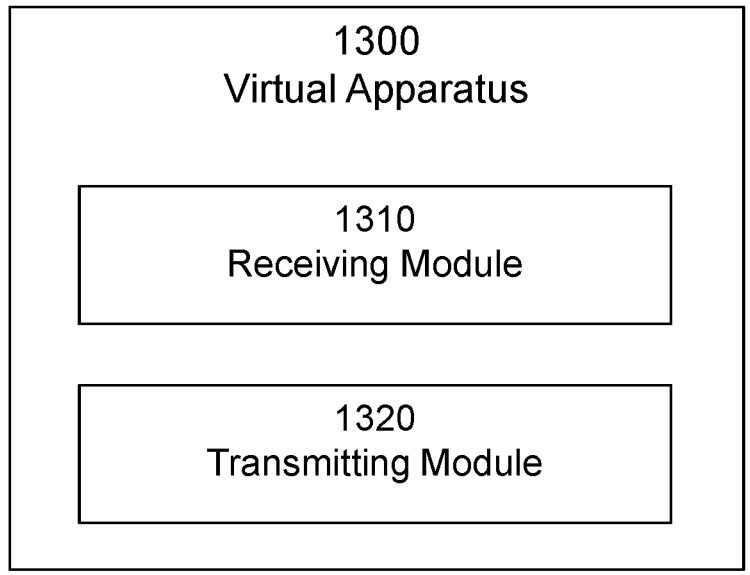
FIG. 21 illustrates another exemplary virtual computing device, according to certain embodiments.

FIG. 21 illustrates a schematic block diagram of a virtual apparatus 1300 in a wireless network (for example, the wireless network shown in FIG. 7). The apparatus may be implemented in a wireless device or network node (e.g., wireless device 110 or network node 160 shown in FIG. 7). Apparatus 1300 is operable to carry out the example method described with reference to FIG. 20 and possibly any other processes or methods disclosed herein. It is also to be understood that the method of FIG. 20 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1310, transmitting module 1320, and any other suitable units of apparatus 1300 to perform corresponding functions according one or more embodiments of the present disclosure.

According to certain embodiments, receiving module 1310 may perform certain of the receiving functions of the apparatus 1300. For example, receiving module 1310 may receive, from a network node 160, one or more bandwidth pieces. The data scheduled in one of the one or more bandwidth pieces includes at least one complete transport block and control information corresponding to the at least one complete transport block.

According to certain embodiments, transmitting module 1320 may perform certain of the transmitting functions of the apparatus 1300. For example, transmitting module 1320 may transmit the data based on the scheduling or control information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
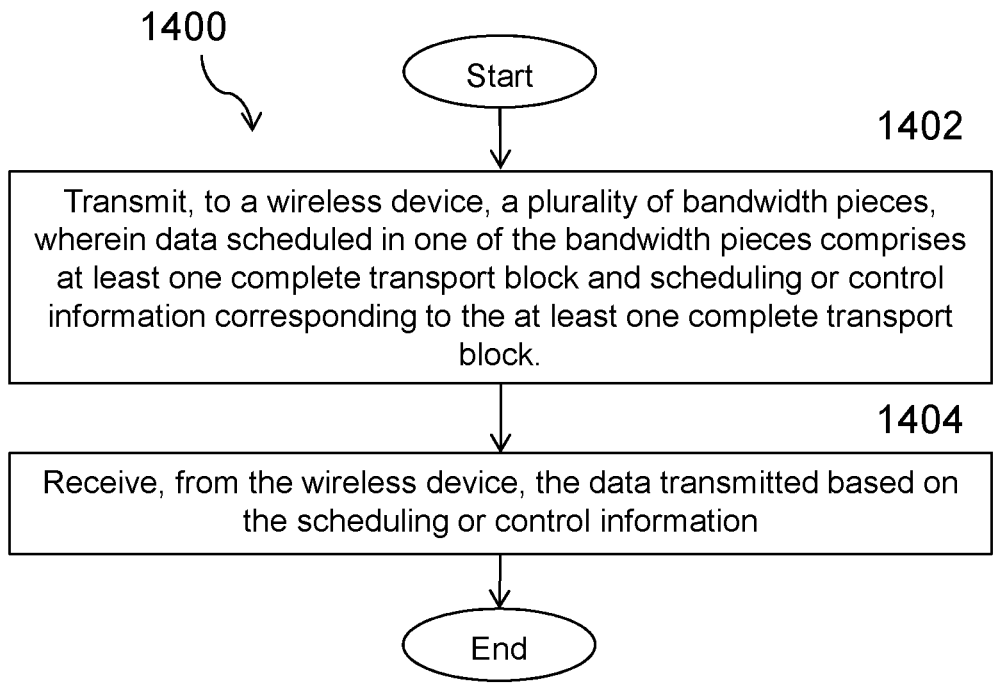
FIG. 22 illustrates an example method by a network node, according to certain embodiments.

FIG. 22 depicts a method by a network node, according to certain embodiments. At step 1402, the network node transmits, to a wireless device, a plurality of bandwidth pieces, wherein data scheduled in one of the bandwidth pieces comprises at least one complete transport block and scheduling or control information corresponding to the at least one complete transport block. At step 1404, the network node receives, from the wireless device, the data transmitted based on the scheduling or control information.

Figure 23:
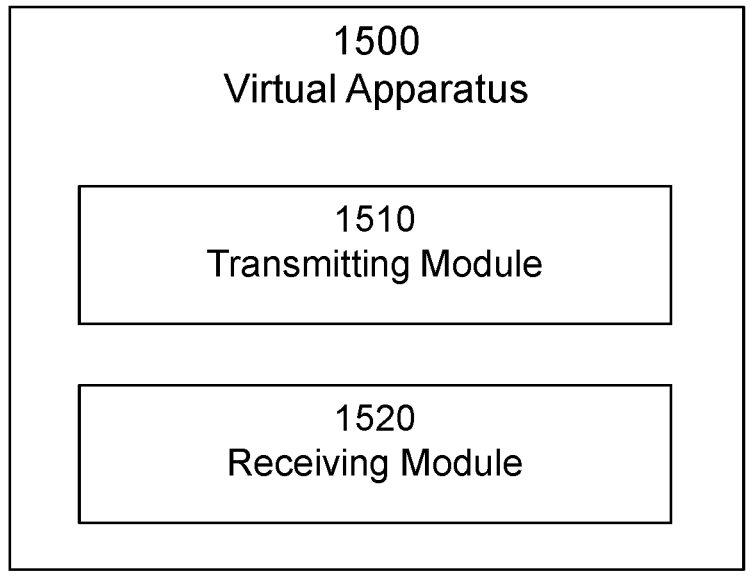
FIG. 23 illustrates another exemplary virtual computing device, according to certain embodiments.

FIG. 23 illustrates a schematic block diagram of a virtual apparatus 1500 in a wireless network (for example, the wireless network shown in FIG. 7). The apparatus may be implemented in a wireless device or network node (e.g., wireless device 110 or network node 160 shown in FIG. 7). Apparatus 1500 is operable to carry out the example method described with reference to FIG. 22 and possibly any other processes or methods disclosed herein. It is also to be understood that the method of FIG. 22 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1510, receiving module 1520, and any other suitable units of apparatus 1500 to perform corresponding functions according one or more embodiments of the present disclosure.

According to certain embodiments, transmitting module 1510 may perform certain of the transmitting functions of the apparatus 1500. For example, transmitting module 1510 may transmit, to a wireless device, a plurality of bandwidth pieces, wherein data scheduled in one of the bandwidth pieces comprises at least one complete transport block and scheduling or control information corresponding to the at least one complete transport block.

According to certain embodiments, receiving module 1520 may perform certain of the receiving functions of the apparatus 1500. For example, receiving module 1520 may receive the data based on the scheduling or control information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 24:
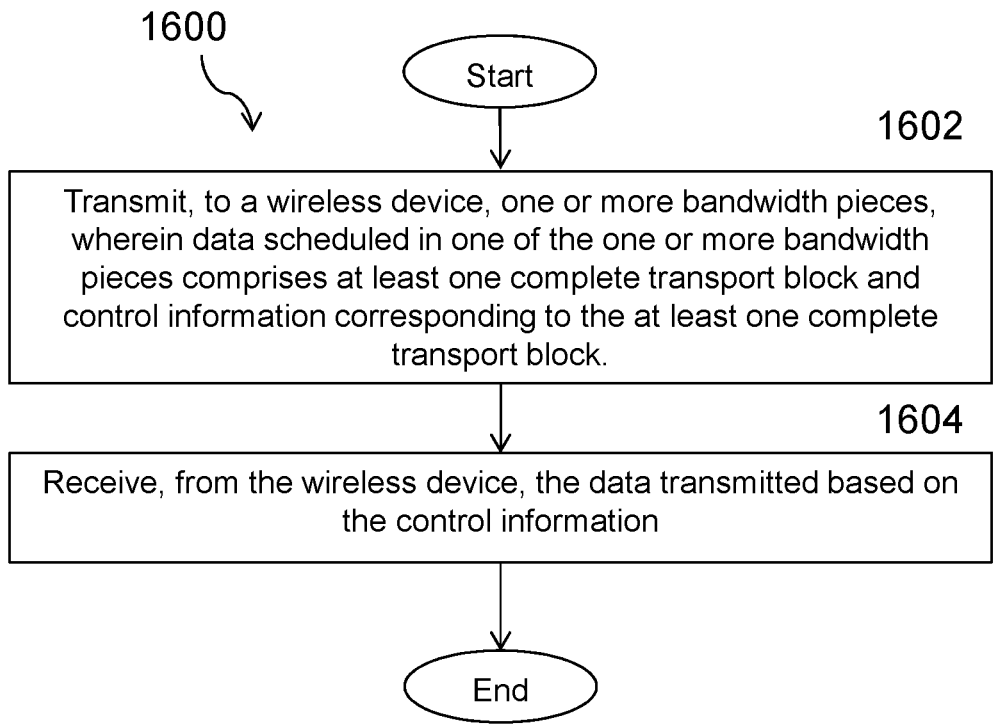
FIG. 24 illustrates another example method by a network node, according to certain embodiments.

FIG. 24 depicts a method by a network node 160, according to certain embodiments. At step 1602, the network node transmits, to a wireless device 110, one or more bandwidth pieces. The data scheduled in one of the one or more bandwidth pieces comprises at least one complete transport block and control information corresponding to the at least one complete transport block. At step 1604, network node 116 receives, from the wireless device 110, the data transmitted based on the scheduling or control information.

In a particular embodiment, the at least one complete transport block is allocated per LBT bandwidth unit.

In a particular embodiment, each of the one or more bandwidth pieces corresponds to one or multiple bandwidth units.

In a particular embodiment, network node 160 transmits an uplink grant scheduling a plurality of transport blocks. In a further particular embodiment, the plurality of transport blocks comprises the at least one complete transport block. In a further particular embodiment, the uplink grant comprises a set of HARQ identifiers. In a further particular embodiment, the uplink grant comprises a first HARQ identifier from which at least one additional HARQ identifier is derived.

In a particular embodiment, network node 160 transmits, to the wireless device 110, an uplink grant scheduling one transport block per bandwidth piece.

In a particular embodiment, the uplink grant comprises a HARQ identifier and a bandwidth piece in which a particular transport block should be transmitted on an uplink.

In a particular embodiment, the bandwidth piece in which the uplink grant is transmitted corresponds to the bandwidth piece used for the transmission of the scheduled transmission block.

In a particular embodiment, network node 160 configures the wireless device 110 to monitor at least one search space for each of the one or more bandwidth pieces. In a further particular embodiment, the at least one search space is determined based on a frequency offset for moving a CORESET associated with the one or more bandwidth pieces to a new location.

In a particular embodiment, transmitting, to the wireless device, a listen-before-talk, LBT, bandwidth piece bitmap, wherein each bit in the LBT bandwidth piece bitmap corresponds to one of the one or more bandwidth pieces, and wherein configuring the wireless device to monitor the at least one search space for each of the one or more bandwidth pieces comprises configuring the wireless device to perform physical downlink control channel monitoring in the one of more bandwidth pieces based on the LBT bandwidth piece bitmap.

In a particular embodiment, network node 160 configures the wireless device 110 to apply the control information for the one or more bandwidth pieces. In a further particular embodiment, network node 160 configures the wireless device 110 to repeatedly apply the control information for each of the one or more bandwidth pieces.

In a particular embodiment, network node 160 receives, from the wireless device 110, control information on the one or more bandwidth pieces.

Figure 25:
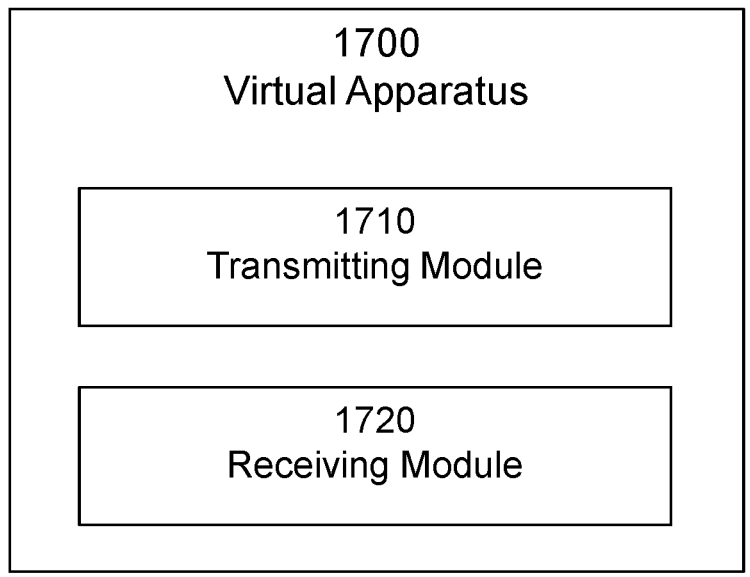
FIG. 25 illustrates another exemplary virtual computing device, according to certain embodiments.

FIG. 25 illustrates a schematic block diagram of a virtual apparatus 1700 in a wireless network (for example, the wireless network shown in FIG. 7). The apparatus may be implemented in a wireless device or network node (e.g., wireless device 110 or network node 160 shown in FIG. 7). Apparatus 1500 is operable to carry out the example method described with reference to FIG. 24 and possibly any other processes or methods disclosed herein. It is also to be understood that the method of FIG. 24 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710, receiving module 1720, and any other suitable units of apparatus 1700 to perform corresponding functions according one or more embodiments of the present disclosure.

According to certain embodiments, transmitting module 1710 may perform certain of the transmitting functions of the apparatus 1700. For example, transmitting module 1710 may transmit, to a wireless device, one or more bandwidth pieces. The data scheduled in one of the one or more bandwidth pieces comprises at least one complete transport block and control information corresponding to the at least one complete transport block.

According to certain embodiments, receiving module 1720 may perform certain of the receiving functions of the apparatus 1700. For example, receiving module 1720 may receive, from the wireless device 110, the data transmitted based on the scheduling or control information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 26:
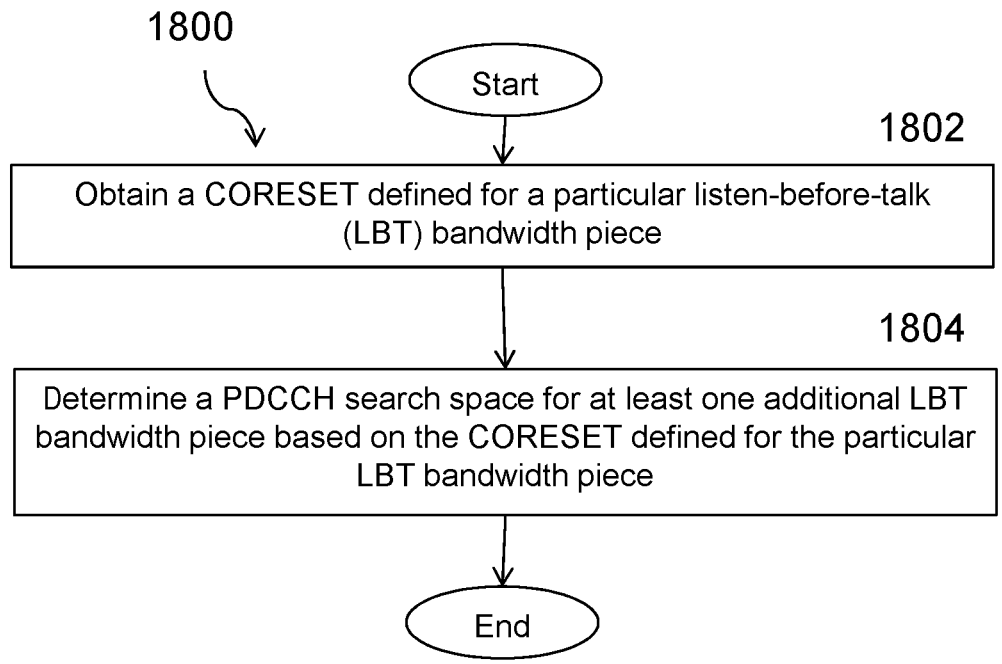
FIG. 26 illustrates an example method by a transmitter, according to certain embodiments.

FIG. 26 depicts a method 1800 by a transmitter, according to certain embodiments. At step 1802, the transmitter obtains a CORESET defined for a particular listen-before-talk (LBT) bandwidth piece. At step 1804, the transmitter determines a PDCCH search space for at least one additional LBT bandwidth piece based on the CORESET defined for the particular LBT bandwidth piece.

Figure 27:
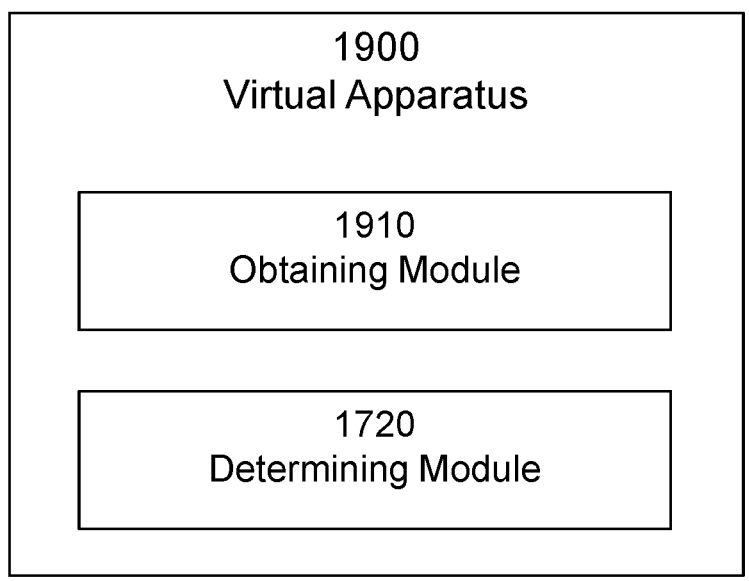
FIG. 27 illustrates another exemplary virtual computing device, according to certain embodiments.

FIG. 27 illustrates a schematic block diagram of a virtual apparatus 1900 in a wireless network (for example, the wireless network shown in FIG. 7). The apparatus may be implemented in a wireless device or network node (e.g., wireless device 110 or network node 160 shown in FIG. 7). Apparatus 1900 is operable to carry out the example method described with reference to FIG. 26 and possibly any other processes or methods disclosed herein. It is also to be understood that the method of FIG. 26 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1910, determining module 1920, and any other suitable units of apparatus 1900 to perform corresponding functions according one or more embodiments of the present disclosure.

According to certain embodiments, obtaining module 1910 may perform certain of the obtaining functions of the apparatus 1900. For example, obtaining module 1910 may obtains a CORESET defined for a particular listen-before-talk (LBT) bandwidth piece.

According to certain embodiments, determining module 1920 may perform certain of the determining functions of the apparatus 1900. For example, determining module 1920 may determine a PDCCH search space for at least one additional LBT bandwidth piece based on the CORESET defined for the particular LBT bandwidth piece.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Embodiment 1

A method by a wireless device comprising:
receiving, from a network node, a plurality of bandwidth pieces, wherein data scheduled in one of the bandwidth pieces comprises at least one complete transport block and scheduling or control information corresponding to the at least one complete transport block; and
transmitting the data based on the scheduling or control information.

Embodiment 2

The method of embodiment 1, wherein the at least one complete transport block is allocated per listen-before-talk (LBT) bandwidth unit.

Embodiment 3

The method of any one of embodiments 1 to 2, wherein each of the plurality of bandwidth pieces corresponds to one or multiple bandwidth units.

Embodiment 4

The method of any one of embodiments 1 to 3, further comprising decoding the data scheduled in the one of the bandwidth pieces based on the scheduling or control information in the at least one complete transport block.

Embodiment 5

The method of any one of embodiments 1 to 4, further comprising: receiving an uplink grant scheduling a plurality of transport blocks.

Embodiment 6

The method of embodiment 5, wherein the plurality of transport blocks comprises the at least one complete transport block.

Embodiment 7

The method of any one of embodiments 5 to 6, wherein the uplink grant comprises a set of hybrid automat repeat request (HARQ) identifiers.

Embodiment 8

The method of any one of embodiments 5 to 6, wherein the uplink grant comprises a first HARQ identifier and the method further comprises: deriving at least one additional HARQ identifier based on the first HARQ identifier.

Embodiment 9

The method of any one of embodiments 1 to 4, further comprising: receiving an uplink grant scheduling one transport block per bandwidth piece.

Embodiment 10

The method of embodiment 9, wherein the uplink grant comprises a HARQ identifier and a bandwidth piece in which a particular transport block should be transmitted on an uplink.

Embodiment 11

The method of embodiment 10, further comprising: transmitting the particular transport block on the uplink.

Embodiment 12

The method of embodiment 9, further comprising determining that the bandwidth piece in which the uplink grant was received corresponds to the bandwidth piece used for the transmission of the scheduled transmission block.

Embodiment 13

A computer program comprising instructions which when executed on a computer perform any of the methods of embodiments 1 to 12.

Embodiment 14

A computer program product comprising computer program, the computer program comprising instructions which when executed on a computer perform any of the methods of embodiments 1 to 12.

Embodiment 15

A non-transitory computer readable medium storing instructions which when executed by a computer perform any of the methods of embodiments 1 to 12.

Embodiment 16

A wireless device comprising:
memory operable to store instructions; and
processing circuitry operable to execute the instructions to cause the wireless device to perform any of embodiments 1 to 12.

Embodiment 17

A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE
receives a plurality of bandwidth pieces, wherein data scheduled in one of the bandwidth pieces comprises at least one complete transport block and scheduling or control information corresponding to the at least one complete transport block; and
transmits the data based on the scheduling or control information.

Embodiment 18

The method of embodiment 17, further comprising:
at the UE, receiving the user data from the base station.

Embodiment 19

The method of any of embodiments 1 to 12, further comprising:
providing user data; and
forwarding the user data to a host computer via the transmission to the base station.

Embodiment 20

A method implemented in a communication system including a host computer, a base station and a user equipment (UE), the method comprising:
at the host computer, receiving user data transmitted to the base station from the UE, wherein the UE
receives a plurality of bandwidth pieces, wherein data scheduled in one of the bandwidth pieces comprises at least one complete transport block and scheduling or control information corresponding to the at least one complete transport block; and
transmits the data based on the scheduling or control information.

Embodiment 21

The method of embodiment 18, further comprising:
at the UE, providing the user data to the base station.

Embodiment 22

The method of embodiment 21, further comprising:
at the UE, executing a client application, thereby providing the user data to be transmitted; and
at the host computer, executing a host application associated with the client application.

Embodiment 23

The method of embodiment 22, further comprising:
at the UE, executing a client application; and at the UE, receiving input data to the client application, the input data being provided at the host computer by executing a host application associated with the client application, wherein the user data to be transmitted is provided by the client application in response to the input data.

Embodiment 24

A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to
receive a plurality of bandwidth pieces, wherein data scheduled in one of the bandwidth pieces comprises at least one complete transport block and scheduling or control information corresponding to the at least one complete transport block; and
transmit the data based on the scheduling or control information.

Embodiment 25

The communication system of embodiment 24, further including the UE.

Embodiment 26

The communication system of embodiment 25, wherein the cellular network further includes a base station configured to communicate with the UE.

Embodiment 27

The communication system of embodiment 25 or 26, wherein:
the processing circuitry of the host computer is configured to execute a host application, thereby providing the user data; and
the UE's processing circuitry is configured to execute a client application associated with the host application.

Embodiment 28

A communication system including a host computer comprising:
a communication interface configured to receive user data originating from a transmission from a user equipment (UE) to a base station,
wherein the UE comprises a radio interface and processing circuitry, the UE's processing circuitry configured to:
receive a plurality of bandwidth pieces, wherein data scheduled in one of the bandwidth pieces comprises at least one complete transport block and scheduling or control information corresponding to the at least one complete transport block; and
transmit the data based on the scheduling or control information.

Embodiment 29

The communication system of embodiment 28, further including the UE.

Embodiment 30

The communication system of embodiment 29, further including the base station, wherein the base station comprises a radio interface configured to communicate with the UE and a communication interface configured to forward to the host computer the user data carried by a transmission from the UE to the base station.

Embodiment 31

The communication system of embodiments 29 or 30, wherein:
the processing circuitry of the host computer is configured to execute a host application; and
the UE's processing circuitry is configured to execute a client application associated with the host application, thereby providing the user data.

Embodiment 32

The communication system of embodiments 30 or 31, wherein:
the processing circuitry of the host computer is configured to execute a host application, thereby providing request data; and
the UE's processing circuitry is configured to execute a client application associated with the host application, thereby providing the user data in response to the request data.

Embodiment 33

A method in a network node comprising:
transmitting, to a wireless device, a plurality of bandwidth pieces, wherein data scheduled in one of the bandwidth pieces comprises at least one complete transport block and scheduling or control information corresponding to the at least one complete transport block; and
receiving, from the wireless device, the data transmitted based on the scheduling or control information.

Embodiment 34

The method of embodiment 33, wherein the at least one complete transport block is allocated per listen-before-talk (LBT) bandwidth unit.

Embodiment 35

The method of any one of embodiments 33 to 34, wherein each of the plurality of bandwidth pieces corresponds to one or multiple bandwidth units.

Embodiment 36

The method of any one of embodiments 33 to 35, further comprising:

transmitting an uplink grant scheduling a plurality of transport blocks.

Embodiment 37

The method of embodiment 36, wherein the plurality of transport blocks comprises the at least one complete transport block.

Embodiment 38

The method of any one of embodiments 36 to 37, wherein the uplink grant comprises a set of hybrid automat repeat request (HARQ) identifiers.

Embodiment 39

The method of any one of embodiments 36 to 37, wherein the uplink grant comprises a first HARQ identifier from which at least one additional HARQ identifier is derived.

Embodiment 40

The method of any one of embodiments 33 to 39, further comprising:
receiving an uplink grant scheduling one transport block per bandwidth piece.

Embodiment 41

The method of embodiment 40, wherein the uplink grant comprises a HARQ identifier and a bandwidth piece in which a particular transport block should be transmitted on an uplink.

Embodiment 42

The method of embodiment 41, wherein the bandwidth piece in which the uplink grant is received corresponds to the bandwidth piece used for the transmission of the scheduled transmission block.

Embodiment 43

A computer program comprising instructions which when executed on a computer perform any of the methods of embodiments 33 to 42.

Embodiment 44

A computer program product comprising computer program, the computer program comprising instructions which when executed on a computer perform any of the methods of embodiments 33 to 42.

Embodiment 45

A non-transitory computer readable medium storing instructions which when executed by a computer perform any of the methods of embodiments 33 to 42.

Embodiment 46

A network node comprising:
memory operable to store instructions; and
processing circuitry operable to execute the instructions to cause the wireless device to perform any of embodiments 33 to 42.

Embodiment 47

A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs
transmit, to the UE, a plurality of bandwidth pieces, wherein data scheduled in one of the bandwidth pieces comprises at least one complete transport block and scheduling or control information corresponding to the at least one complete transport block; and
receive, from the UE, the data transmitted based on the scheduling or control information.

Embodiment 48

The method of embodiment 47, further comprising:
at the base station, transmitting the user data.

Embodiment 49

The method of embodiment 48, wherein the user data is provided at the host computer by executing a host application, the method further comprising:
at the UE, executing a client application associated with the host application.

Embodiment 50

A method implemented in a communication system including a host computer, a base station and a user equipment (UE), the method comprising:
at the host computer, receiving, from the base station, user data originating from a transmission which the base station has received from the UE, wherein the base station
transmits, to the UE, a plurality of bandwidth pieces, wherein data scheduled in one of the bandwidth pieces comprises at least one complete transport block and scheduling or control information corresponding to the at least one complete transport block; and
receives, from the UE, the data transmitted based on the scheduling or control information.

Embodiment 51

The method of embodiment 50, further comprising:
at the base station, receiving the user data from the UE.

Embodiment 52

The method of embodiment 51, further comprising:
at the base station, initiating a transmission of the received user data to the host computer.

Embodiment 53

A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to:

transmit, to the UE, a plurality of bandwidth pieces, wherein data scheduled in one of the bandwidth pieces comprises at least one complete transport block and scheduling or control information corresponding to the at least one complete transport block; and receive, from the UE, the data transmitted based on the scheduling or control information.

Embodiment 54

The communication system of embodiment 53, further including the base station.

Embodiment 55

The communication system of embodiment 54, further including the UE, wherein the UE is configured to communicate with the base station.

Embodiment 56

The communication system of embodiment 55, wherein:
the processing circuitry of the host computer is configured to execute a host application, thereby providing the user data; and
the UE comprises processing circuitry configured to execute a client application associated with the host application.

Embodiment 57

A communication system including a host computer comprising a communication interface configured to receive user data originating from a transmission from a user equipment (UE) to a base station, wherein the base station comprises a radio interface and processing circuitry, the base station's processing circuitry configured to transmit, to the UE, a plurality of bandwidth pieces, wherein data scheduled in one of the bandwidth pieces comprises at least one complete transport block and scheduling or control information corresponding to the at least one complete transport block; and receive, from the UE, the data transmitted based on the scheduling or control information.

Embodiment 58

The communication system of embodiment 5, further including the base station.

Embodiment 59

The communication system of embodiment 58, further including the UE, wherein the UE is configured to communicate with the base station.

Embodiment 60

The communication system of embodiment 59, wherein:
the processing circuitry of the host computer is configured to execute a host application;
the UE is configured to execute a client application associated with the host application, thereby providing the user data to be received by the host computer.

Embodiment 61

A method by a transmitter comprising:
obtaining a CORESET defined for a particular listen-before-talk (LBT) bandwidth piece
determining a PDCCH search space for at least one additional LBT bandwidth piece based on the CORESET defined for the particular LBT bandwidth piece.

Embodiment 62

The method of claim 61 wherein the CORESET comprises frequency resources located within the particular LBT bandwidth piece.

Embodiment 63

The method of any one of claims 61 to 62, wherein the PDCCH search space for the at least one additional LBT bandwidth piece is determined by a new frequency offset field for NR-U search space in an RRC configuration.

Embodiment 64

The method of claim 63 further comprising:
monitoring the frequency offset to mover the CORESET to a new frequency location.

Embodiment 65

The method of claims 63 to 64, wherein the frequency offset is in units of resource blocks or a resource block group size.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMBB Enhanced Mobile BroadBand
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SS Synchronization Signal
SSS Secondary Synchronization Signal
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method in a wireless device, the method comprising:
receiving, from a network node, an uplink grant scheduling one or more transport blocks in one or more bandwidth pieces, wherein each bandwidth piece corresponds to at least one listen-before-talk, LBT, bandwidth unit;
determining at least one search space based on a frequency offset for moving a CORESET associated with a first bandwidth piece to a new location;
monitoring the at least one search space for each of the one or more bandwidth pieces; and
transmitting data in the one or more bandwidth pieces based on the received uplink grant, wherein the data comprises the one or more transport blocks and uplink control information corresponding to the one or more transport blocks.

2. The method of claim 1, wherein the one or more transport blocks are allocated per LBT bandwidth unit.

3. The method of claim 1, wherein the uplink grant comprises a set of hybrid automatic repeat request, HARQ, identifiers.

4. The method of claim 1, wherein the uplink grant comprises a first HARQ identifier and the method further comprises:
deriving at least one additional HARQ identifier based on the first HARQ identifier.

5. The method of claim 1, wherein the uplink grant schedules one transport block per bandwidth piece and comprises an identification of the bandwidth piece in which a particular transport block should be transmitted.

6. The method of claim 5, further comprising determining that the bandwidth piece in which the one or more transport blocks is scheduled corresponds to the bandwidth piece in which the uplink grant was received.

7. The method of claim 1, further comprising receiving a listen-before-talk, LBT, bandwidth piece bitmap from the network node, wherein each bit in the LBT bandwidth piece bitmap corresponds to one of the one or more bandwidth pieces, and wherein monitoring the at least one search space comprises performing physical downlink control channel (PDCCH) monitoring in the one of more bandwidth pieces based on the LBT bandwidth piece bitmap.

8. The method of claim 1, wherein the uplink control information is repeated in each one of the one or more bandwidth pieces.

9. The method of claim 1, further comprising receiving at least one of a location and a bandwidth of a bandwidth piece from the network node via layer1 or higher layer signaling.

10. A non-transitory computer readable medium storing instructions which when executed by a computer perform any of the methods of claim 1.

11. A wireless device comprising:
memory operable to store instructions; and
processing circuitry operable to execute the instructions to cause the wireless device to:
receive, from a network node, an uplink grant scheduling one or more transport blocks in one or more bandwidth piece, wherein each bandwidth piece corresponds to at least one listen-before-talk, LBT, bandwidth unit;
determine at least one search space based on a frequency offset for moving a CORESET associated with a first bandwidth piece to a new location;
monitor the at least one search space for each of the one or more bandwidth pieces; and
transmit data in the one or more bandwidth pieces based on the received uplink grant, wherein the data comprises the one or more transport blocks and uplink control information corresponding to the one or more transport blocks.

12. The wireless device of claim 11, wherein the one or more transport blocks are allocated per LBT bandwidth unit.

13. A method in a network nod, the method comprising:
transmitting, to a wireless device, an uplink grant scheduling one or more transport blocks in one or more bandwidth pieces, wherein each bandwidth piece corresponds to at least one listen-before-talk, LBT, bandwidth unit;
configuring the wireless device to monitor the at least one search space for each of the one or more bandwidth pieces, wherein the at least one search space is determined based on a frequency offset for moving a CORESET associated with a first bandwidth piece to a new location; and
receiving, from the wireless device, the data transmitted in the one or more bandwidth pieces based on the uplink grant, wherein the data comprises the one or more transport blocks and uplink control information corresponding to the one or more transport blocks.

14. The method of claim 13, wherein the one or more transport blocks are allocated per LBT bandwidth unit.

15. The method of claim 13, wherein the uplink grant comprises a set of hybrid automat repeat request, HARQ, identifiers.

16. The method of claim 15, wherein the uplink grant comprises a first HARQ identifier from which at least one additional HARQ identifier can be derived.

17. The method of claim 13, wherein the uplink grant schedules one transport block per bandwidth piece and comprises an identification of the bandwidth piece in which a particular transport block should be transmitted.

18. The method of claim 17, wherein the bandwidth piece in which the one or more transport blocks is scheduled corresponds to the bandwidth piece in which the uplink grant is.

19. The method of claim 18, further comprising transmitting, to the wireless device, a listen-before-talk, LBT, bandwidth piece bitmap, wherein each bit in the LBT bandwidth piece bitmap corresponds to one of the one or more bandwidth pieces, and wherein configuring the wireless device to monitor the at least one search space comprises configuring the wireless device to perform physical downlink control channel (PDCCH) monitoring in the one of more bandwidth pieces based on the LBT bandwidth piece bitmap.

20. The method of claim 19, further comprising configuring the wireless device to repeat the uplink control information in each one of the one or more bandwidth pieces.

21. The method of claim 13, further comprising receiving, from the wireless device, control information on the one or more bandwidth pieces.

22. The method of claim 13, further comprising transmitting at least one of a location and a bandwidth of a bandwidth piece to the wireless device via layer1 or higher layer signaling.

23. A non-transitory computer readable medium storing instructions which when executed by a computer perform any of the methods of claim 13.

24. A network node comprising:
memory operable to store instructions; and
processing circuitry operable to execute the instructions to cause the network node to:
transmit, to a wireless device, an uplink grant scheduling one or more transport blocks in one or more bandwidth pieces, wherein each bandwidth piece corresponds to at least one listen-before talk, LBT, bandwidth unit;
configure the wireless device to monitor the at least one search space for each of the one or more bandwidth pieces, wherein the at least one search space is determined based on a frequency offset for moving a CORESET associated with a first bandwidth piece to a new location; and
receive, from the wireless device, the data transmitted in the one or more bandwidth pieces based on the uplink grant, wherein the data comprises the one or more transport blocks and uplink control information corresponding to the one or more transport blocks.

25. The network node of claim 24, wherein the one or more transport blocks are allocated per LBT bandwidth unit.

26. The wireless device of claim 1, wherein the data transmitted in the one or more bandwidth pieces corresponding to the one or more transport blocks comprises at least one complete transport block without transport block splitting.

* * * * *